US010264167B2

(12) United States Patent
Shintani

(10) Patent No.: US 10,264,167 B2
(45) Date of Patent: Apr. 16, 2019

(54) IMAGING APPARATUS

(71) Applicant: Panasonic Intellectual Property Management Co., Ltd., Osaka (JP)

(72) Inventor: Dai Shintani, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 31 days.

(21) Appl. No.: 15/665,487

(22) Filed: Aug. 1, 2017

(65) Prior Publication Data
US 2018/0048795 A1 Feb. 15, 2018

(30) Foreign Application Priority Data

Aug. 10, 2016 (JP) .................................. 2016-157159
Jun. 9, 2017 (JP) .................................. 2017-113918

(51) Int. Cl.
*H04N 5/225* (2006.01)
*H04N 5/232* (2006.01)
(Continued)

(52) U.S. Cl.
CPC ......... *H04N 5/2254* (2013.01); *H04N 5/2256* (2013.01); *H04N 5/23212* (2013.01);
(Continued)

(58) Field of Classification Search
USPC ................................ 396/157, 167, 169, 246
See application file for complete search history.

(56) References Cited

U.S. PATENT DOCUMENTS 5,848,306 A * 12/1998 Shono ..................... G03B 9/70
396/198
6,721,006 B1 * 4/2004 Hata ...................... H04N 5/335
348/294

(Continued)

FOREIGN PATENT DOCUMENTS

| JP | 2008-060640 | 3/2008 |
| JP | 2008-147979 | 6/2008 |
| JP | 2014-209744 | 11/2014 |

*Primary Examiner* — Clayton E. LaBalle
*Assistant Examiner* — Linda B Smith
(74) *Attorney, Agent, or Firm* — Renner Otto Boisselle & Sklar, LLP

(57) ABSTRACT

An imaging apparatus of the present disclosure includes an imaging element that sequentially resets accumulated electric charges in a first direction to start exposure, and captures, during the exposure, a subject image entered via an optical system to generate an image signal an image processor that performs predetermined processing on the image signal generated by the imaging element to generate image data, a focal plane shutter including a rear curtain for covering the imaging element to end the exposure, and a controller that sets, when photographing, an electric charge resetting time, for the imaging element, from start of resetting of the electric charges to end of the resetting, and a covering time, for the focal plane shutter, from start of covering of the imaging element by the rear curtain to end of the covering, so that an exposure value (EV) for the imaging element has a predetermined inclination in the first direction, and that outputs an instruction on a flash start timing at which a flash device is caused to start flashing.

10 Claims, 16 Drawing Sheets

(51) Int. Cl.
*H04N 5/243* (2006.01)
*H04N 5/235* (2006.01)

(52) U.S. Cl.
CPC ........... *H04N 5/243* (2013.01); *H04N 5/2351* (2013.01); *H04N 5/2354* (2013.01)

(56) References Cited

U.S. PATENT DOCUMENTS

| | | | | |
|---|---|---|---|---|
| 2005/0265014 | A1* | 12/2005 | Matsui | G03B 15/05 362/5 |
| 2009/0196595 | A1* | 8/2009 | Okubo | G03B 15/05 396/175 |
| 2011/0103788 | A1* | 5/2011 | Kim | G03B 7/00 396/484 |
| 2011/0293257 | A1* | 12/2011 | Ariga | G03B 15/04 396/166 |
| 2017/0094241 | A1* | 3/2017 | Fujiwara | H04N 9/73 |

* cited by examiner

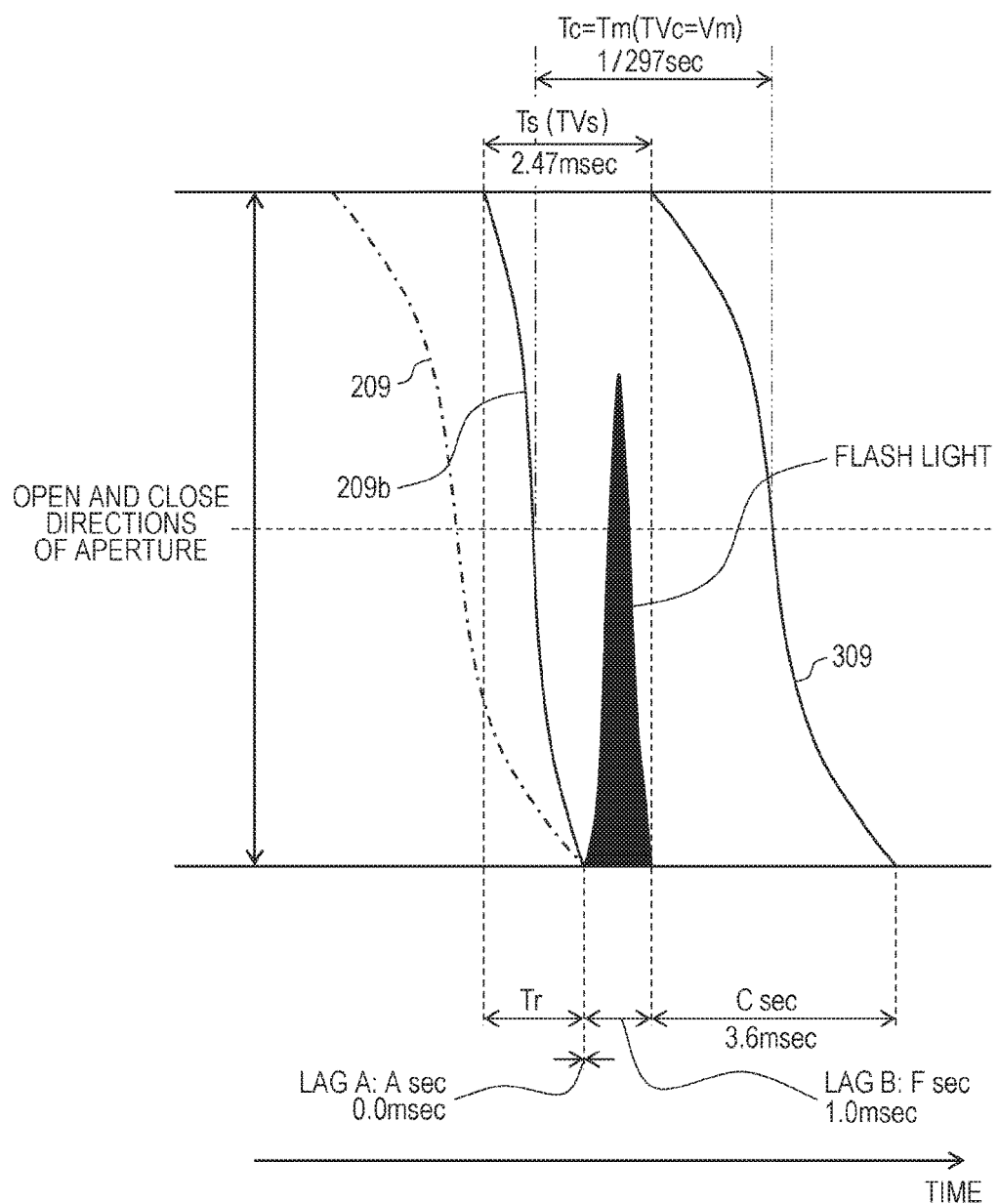

IMAGING APPARATUS

BACKGROUND

1. Technical Field

The present disclosure relates to an imaging apparatus for flash photographing.

2. Description of the Related Art

Unexamined Japanese Patent Publication No. 2008-60640 discloses an imaging apparatus simultaneously using an electronic shutter and a mechanical shutter. This imaging apparatus causes the electronic shutter to quickly reset electric charges regardless of an exposure amount to achieve flash photographing simultaneously using the electronic shutter and the mechanical shutter.

SUMMARY

An imaging apparatus according to the present disclosure includes an imaging element that sequentially resets accumulated electric charges in a first direction to start exposure, and captures, during the exposure, a subject image entered via an optical system to generate an image signal, an image processor that performs predetermined processing on the image signal generated by the imaging element to generate image data, a focal plane shutter including a rear curtain for covering the imaging element for ending the exposure, and a controller that sets, when photographing, an electric charge resetting time, for the imaging element, from start of resetting of the electric charges to end of the resetting, and a covering time, for the focal plane shutter, from start of covering of the imaging element by the rear curtain to end of the covering, so that an EV indicative of an exposure amount for the imaging element has a predetermined inclination in the first direction, and that outputs an instruction on a flash start timing at which, a flash device is caused to start flashing.

According to the present disclosure, a flash synchronization shutter speed can be increased even under various photographic environments to capture natural images that do not show a feeling of wrongness.

BRIEF DESCRIPTION OF THE DRAWINGS

FIG. 9B is a time chart illustrating an exemplary modification of the electronic front curtain trajectory, with respect to the rear curtain trajectory illustrated in FIG. 9A;

DETAILED DESCRIPTION

Hereinafter, exemplary embodiments will be described in detail with reference to the drawings appropriately. However, descriptions in more detail than necessary may be omitted. For example, a detailed description of a matter which is already well-known, or an overlapped description for a substantially identical configuration may be omitted. This is intended to prevent the following description from being unnecessary redundant and to facilitate understanding of a person skilled in the art.

Note that the attached drawings and the following, description are provided for those skilled in the art to fully understand the present disclosure, and are not intended to limit the subject matter as described in the appended claims.

First Exemplary Embodiment

A first exemplary embodiment will now be described herein with reference to FIGS. 1A to 7B.

1-1: Outline of Camera System

Figure 1A:
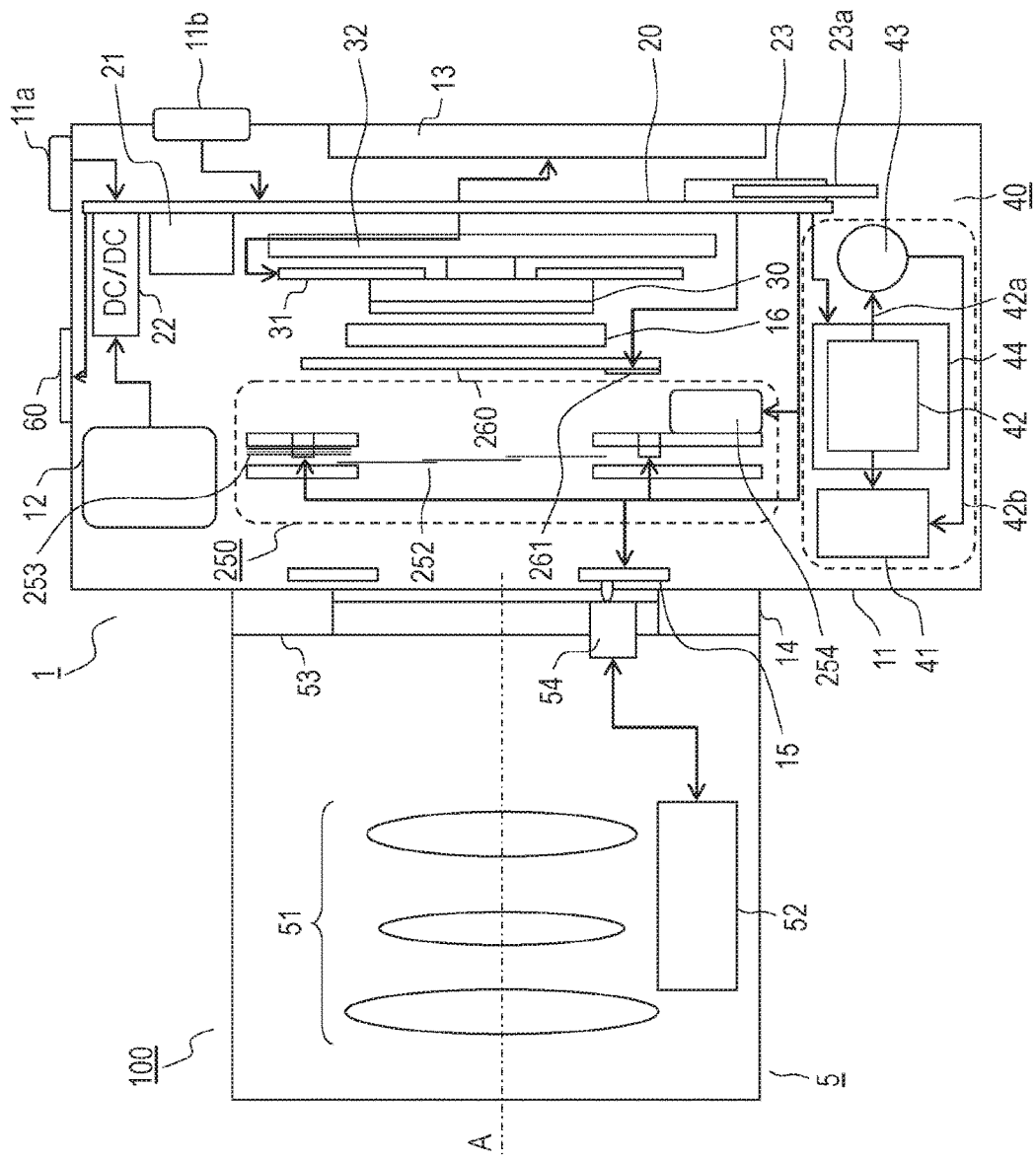
FIG. 1A is a block diagram of a camera system according to a first exemplary embodiment.

FIG. 1A is a block diagram of camera system TOO according to the first exemplary embodiment.

Camera system 100 is a lens-interchangeable camera. Camera system 100 includes camera main body 1, and interchangeable lens 5 detachably attached to camera main body 1. Camera main body 1 is an example of an imaging apparatus.

Camera main body 1 does not include a mirror box device, thus is a mirror-less camera.

For convenience of description, a direction toward a subject refers to front, a direction toward an imaging face refers to rear, a vertically upward direction of camera main body 1 in a normal posture refers to upper, a vertically downward direction of camera main body 1 in the normal posture refers to lower, a direction toward left when camera main body 1 in the normal posture is seen from the subject refers to left, and a direction toward right when camera main body 1 in the normal posture is seen from the subject refers to right. The normal posture of camera main body 1 refers to a posture of camera main body 1 when a longitudinal direction of the imaging face corresponds to a horizontal direction, and a short-length direction of the imaging face corresponds to a vertical direction.

Figure 1B:
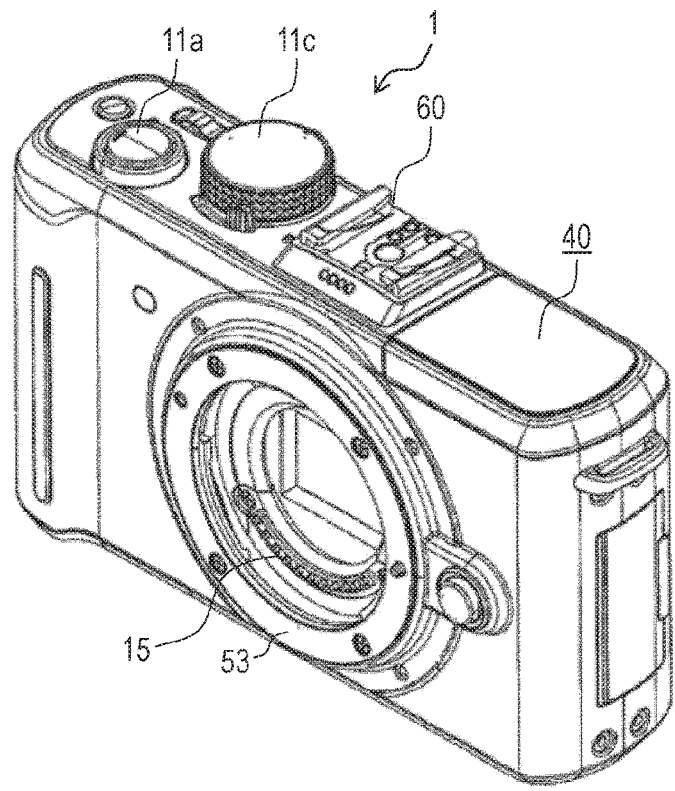
FIG. 1B is a perspective view of a camera main body according to the first exemplary embodiment.
Figure 1C:
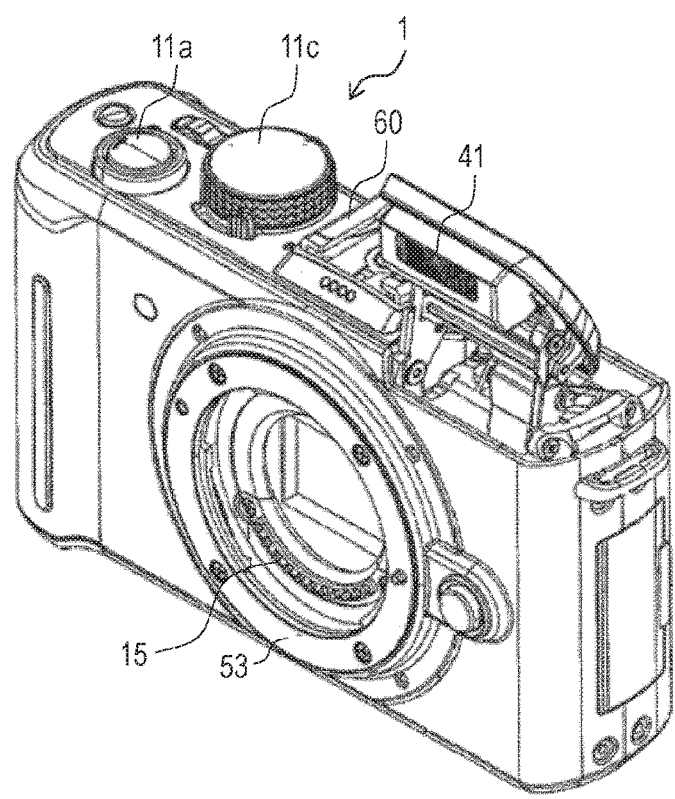
FIG. 1C is a-perspective view of the camera main body according to the first exemplary embodiment at a time of flash photographing.
Figure 1D:
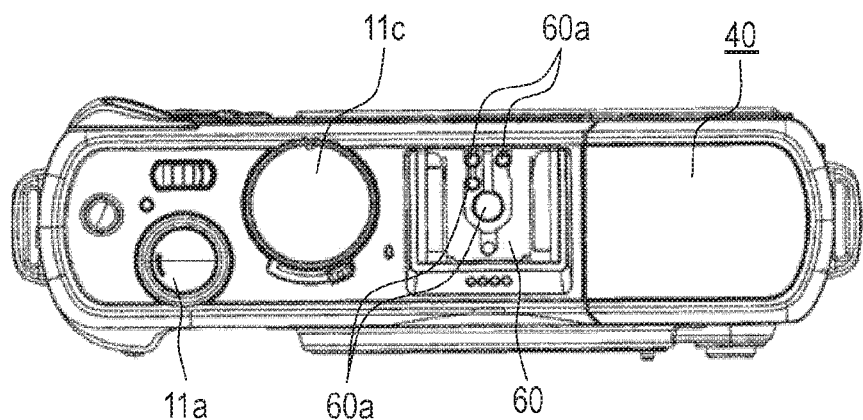
FIG. 1D is a top view of the camera main body according to the first exemplary embodiment.
Figure 1E:
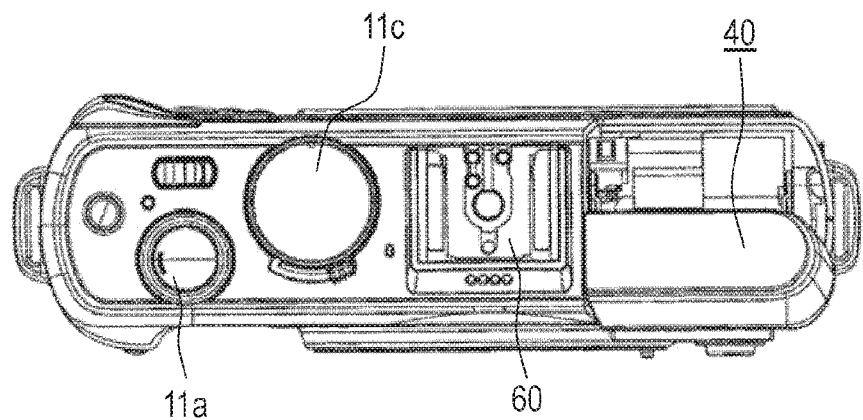
FIG. 1E is a top view of the camera main body according to the first exemplary embodiment at the time of flash photographing.

FIGS. 1B to 1E are external views of camera main body 1 equipped with flash device 40. FIG. 1B is a perspective view of camera main body 1 when flash device 40 is stored, and FIG. 1C is a perspective view of camera main body 1 in an open state where flash device 40 is greatly popped forward and upward from a top face of camera main body 1. FIG. 1D is a top view of camera main body 1 when flash device 40 is stored, and FIG. 1E is a top view of camera main body 1 in the open state where flash device 40 is greatly popped forward and upward from the top face of camera main body 1.

In addition to flash device 40, camera main body 1 includes, on a top lace of a housing, various controlling elements including shutter button 11a and operation dial 11c, as well as includes main body-side hot shoe 60 for an external device. Shutter button 11a is a button for accepting an operation performed by a user to execute an auto-focusing operation and an operation for storing data of a captured image. Operation dial 11c is a button for switching a photographing mode, such as a diaphragm priority mode, a shutter speed priority mode, and a manual mode. Main body-side hot shoe 60 is provided to connect an external device, such as external flash device 540 (see FIG. 8) and an external finder, and is electrically and mechanically connectable with such an external device.

Now back to FIG. 1A to continue description. Camera main body 1 includes exterior cover 11, battery 12, display 13, body mount 14, main body-side contact 15, main circuit board 20, mechanical shutter 250, dust-proof filter 260, optical low-pass filter 16, complementary metal oxide semiconductor (CMOS) image sensor 30, CMOS circuit board 31, heat sink 32, and flash device 40.

Exterior cover 11 configures an exterior of camera main body 1. Exterior cover 11 has an approximately rectangular parallelepiped shape. Shutter button 11a is provided on a top face of exterior cover 11. Shutter button 11a is a two-stage switch. For example, half-pressing shutter button 11a executes auto-focusing, and fully pressing shutter button 11a (pressed fully) captures an image. Provided on a rear face of exterior cover 11 are display 13 and operation button lib for allowing a user to perform various operations.

Body mount 14 is provided on a front face of exterior cover 11. Main body-side contact 15 is provided near body mount 14. Interchangeable lens 5 is attached, to body mount 14 through bayonet coupling. In other words, body mount 14 detachably holds interchangeable lens 5. At this time, lens-side contact 54 described later is electrically connected to main body-side contact 15. Via main body-side contact 15 and lens side contact 54, at least either of data and a control signal can be sent and received between camera main body 1 and interchangeable lens 5. Main body-side contact 15 may be provided to body mount 14.

Exterior coyer 11 accommodates battery 12, optical low-pass filter 16, main circuit board 20, CMOS image sensor 30, CMOS circuit hoard 31, heat sink 32, and flash device 40.

Interchangeable lens 5 includes, as illustrated in FIG. 1A, lens group 51, a power zoom actuator that drives lenses involving in zooming in lens group 51, a focus actuator that drives lenses involving in focusing in lens group 51, a shake correction unit that drives lenses involving in a shake correction in lens group 51, a diaphragm unit, lens control circuit 52, leas mount 53 coupled to camera main body 1, and lens-side contact 54. Lens group 51 has optical axis A. Lens group 51 causes an imaging face (a light receiving face) of CMOS image sensor 30 to form a subject image.

Interchangeable lens 5 is attached, via lens mount 53, to camera, main body 1. Specifically, lens mount 53 is coupled to body mount 14 of camera main body 1 through bayonet coupling. At this time, lens-side contact 54 is electrically connected to main body-side contact 15 of camera main body 1. Lens control circuit 52 controls the power zoom actuator, the focus actuator, the shake correction unit, and the diaphragm unit.

1-2: Components of Camera Main Body

CMOS image sensor 30 converts an optical image formed on the imaging face into an electrical image signal. CMOS image sensor 30 is an example of an imaging element. CMOS image sensor 30 has an electronic shutter function. More specifically. CMOS image sensor 30 functions as a rolling shutter. When CMOS image sensor 30 functions as a rolling shutter. CMOS image sensor 30 specifies one to several scanning lines as a single block. In the first exemplary embodiment, a single scanning line refers to a line parallel to a horizontal direction when all pixels of CMOS image sensor 30 is divided in plural in a vertical direction. In the blocks, CMOS image sensor 30 simultaneously starts accumulation of electric charges, as well as simultaneously ends the accumulation of electric charges.

CMOS circuit board 31 is a circuit board for controlling CMOS image sensor 30. CMOS circuit board 31 may perform predetermined processing, such as an analog-to-digital (AD) conversion, on image data sent from CMOS image sensor 30. CMOS image sensor 30 is attached to CMOS circuit board 31.

Heat sink 32 radiates heat generated from CMOS image sensor 30. Heat sink 32 is closely fixed to CMOS image sensor 30. Heat sink 32 is attached to three bosses provided to exterior cover 11. When heat sink 32 is attached to the bosses, a distance from body mount 14 can be adjusted. A distance from body mount 14 to the imaging face of CMOS image sensor 30, i.e., a flange back, can therefore be adjusted to a predetermined value.

Display 13 includes a liquid crystal display. Display 13 displays an image and other indications corresponding to image data for display. Image data for display includes image data that has undergone image processing and data such as photographing conditions and operation menus for camera main body 1. Display 13 can selectively display moving images and still images. Display 13 can display an observation image of a subject, i.e., a live view image. Display 13 is an example of a display unit.

The display unit may be a device capable of displaying an image, such as an organic electro luminescence (EL), an inorganic EL, and a plasma display panel. Instead of a back face of exterior cover 11, display 13 may be provided on another location, such as a side face and the top face.

Although specifically described later, mechanical shutter 250 is a so-called focal plane shutter capable of forming a slit with front curtain 252 and rear curtain 253 to perform an exposure operation. As will be described later, to perform exposure using an electronic front curtain, rear curtain 253 of mechanical shutter 250 is configured so that single rear curtain 253 can open and close an aperture. Although mechanical shutter 250 includes front curtain 252 in FIG. 1A, front curtain 252 may not be included as long as the electronic front curtain is used. When mechanical shutter 250 includes front curtain 252, front curtain 252 and the electronic front curtain may separately be used depending on a photographing situation.

Optical low-pass filter 16 removes a portion having a higher spatial frequency from incident light. Specifically, optical low-pass filter 16 separates incident light to make a resolution of a subject image coarser than a pitch of pixels of CMOS image sensor 30. An imaging element, such as a CMOS image sensor, is generally provided with a color filter for RGB colors called as a Bayer array and a complementary color filter for YCM colors. Therefore, when a subject image is resolved in conformity to one pixel of CMOS image sensor 30, not only a false color occurs, but also a moire phenomenon occurs in a subject having a repeated pattern. Providing optical low-pass filter 16, however, can suppress occurrence of a false color and a moire phenomenon. Optical low-pass filter 16 is an example of an optical filter.

Optical low-pass filter 16 also has an infrared (IR) cut filter function for removing infrared light.

Optical low-pass filter 16 may be omitted when pixels of CMOS image sensor 30 are extremely smaller, and thus neither a false color nor a moire phenomenon easily occurs, or occurrence of a false color and a moire phenomenon can be suppressed through image processing by means of software.

Dust-proof filter 260 includes piezoelectric element 261. Dust-proof filter 260 causes piezoelectric element 261 to vibrate to remove foreign materials including dust and dirt that negatively affects a captured image. Dust-proof filter 260 may be omitted, and optical low-pass filter 16 may be provided with a function of dust-proof filter 260. For example, a piezoelectric element may be attached to optical low-pass filter 16 at a portion that does not affect photographing, and the piezoelectric element is caused to vibrate to remove dust and dirt adhered on optical low-pass filter 16.

Figure 2:
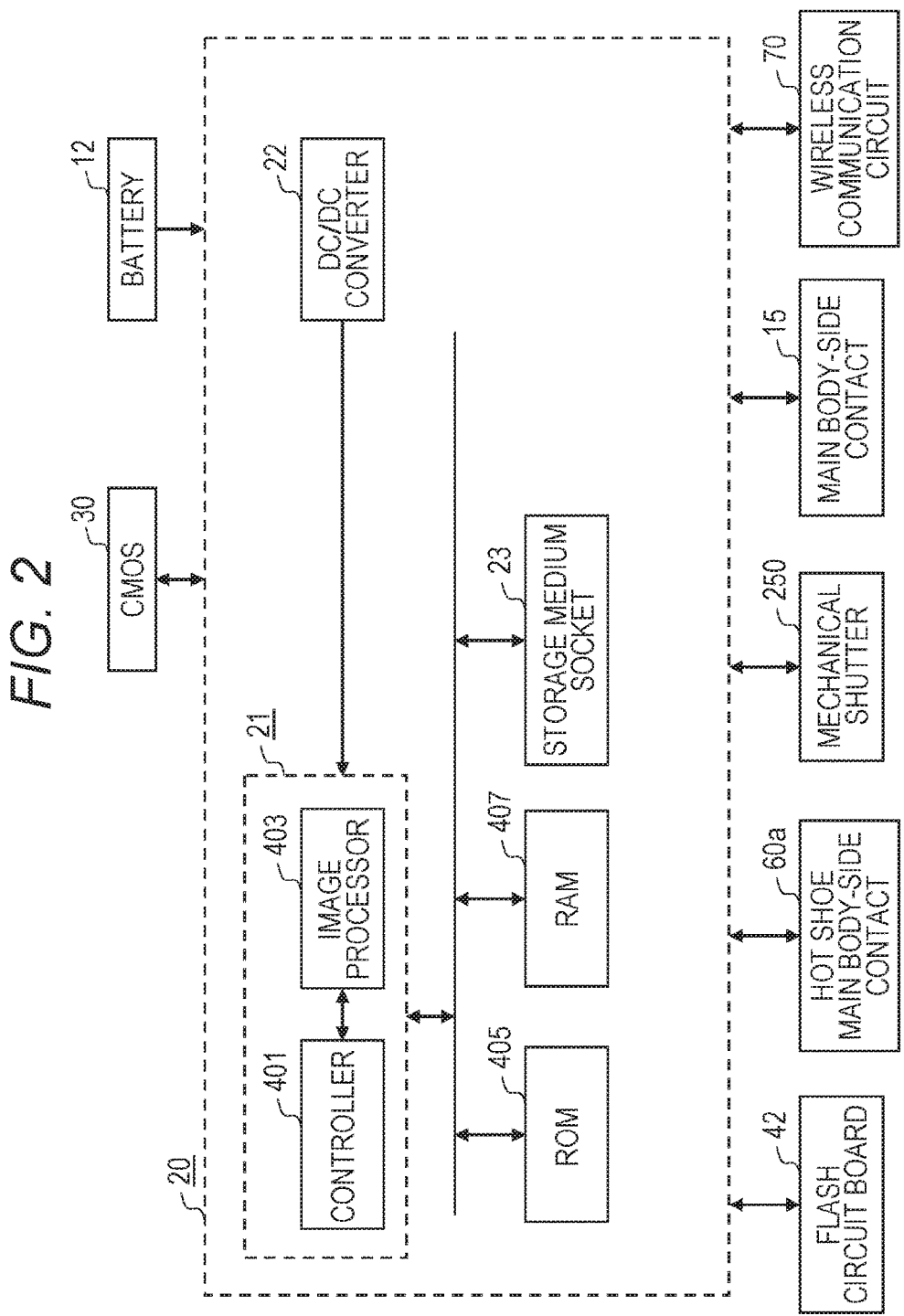
FIG. 2 is a block diagram of a main circuit board according to the first exemplary embodiment.

As illustrated in FIG. 2, main circuit board 20 is mounted with control integrated circuit (IC) 21, read only memory (ROM) 405, random access memory (RAM) 407, direct DC/DC converter 22, and storage medium socket 23.

Control IC 21 includes controller 401 serving as a controller, and image processor 403. Control IC 21 can be achieved by a semiconductor element or another element.

Based on control of controller 401, image processor 403 performs various processing on digital image data generated and converted by CMOS image sensor 30. Image processor 403 generates data of an image to be displayed on display 13, as well as generates image data to be stored, via storage medium socket 23, in storage medium 23a (see FIG. 1A). For example, image processor 403 performs various processing, such as a shading correction, a Gamma correction, a white balance correction, and a damage correction, on image data, generated by CMOS image sensor 30. Image processor 403 RAW-outputs image data generated by CMOS image sensor 30, as well as compresses the image data in a format such as a compression format conforming to a standard such as a JPEG standard.

Controller 401 governs control of whole camera main body 1, such as photographing-related control of camera main body 1. Controller 401 is an example of a controller.

As long as the controller controls camera system 100 or camera main body 1, the controller may have any physical form. For example, controller 401 may be a programmable microcomputer. Controller 401 may also be achieved by hard logic. One element or a plurality of elements may be used to physically configure controller 401. When a plurality of elements is used to configure controller 401, the plurality of elements can be considered to configure a single controller. Similar or identical to control IC 21, controller 401 may be configured as a single element together with a member having another function, such as image processor 403. Controller 401 can be achieved by devices, such as a micro-controller, a central processing unit (CPU), a micro processing unit (MPU), a digital signal processor (DSP), an application specific integrated circuit (ASIC), and a field-programmable gate array (FPGA).

RAM 407 functions as a work memory for image processor 403 and controller 401. RAM 407 can be achieved by, for example, a dynamic random access memory (DRAM) or a ferroelectric memory.

A flash memory, a ferroelectric memory, or another memory is used to configure ROM 405. ROM 405 stores control programs, program charts, and other data for controlling whole camera system 100.

RAM 407 and ROM 405 may be built into or mounted in a mixed manner on control IC 21.

DC/DC converter 22 converts a voltage supplied from battery 12 into a voltage conforming to each device to output the voltage. In other words, battery 12 supplies power, via the DC/DC converter, to camera main body 1 and interchangeable lens 5.

Storage medium 23a can be inserted into storage medium socket 23.

Main circuit board 20 is connected to main body-side hot shoe electric contact 60a, mechanical shutter 250, main body-side contact 15, wireless communication circuit board 70, flash circuit board 42, and other devices.

Controller 401 can control bidirectional communication, via main body-side hot shoe electric contact 60a, with an external device such as external flash device 540 connected to main body-side hot shoe 60.

Controller 401 is connected to drive mechanism 254 (see FIG. 1A) that controls mechanical shutter 250 to control opening and closing of the aperture described later.

Wireless communication circuit board 70 is mounted with a communication module (an example of a communication unit) conforming to a Bluetooth (registered trademark) standard, and therefore controller 401 can control bidirectional communication with an external device connected in a wireless manner. A communication module may conform to infrared communication, a wireless local area network (LAN), or another method, as long as the communication module can be connected to an external device in a wireless manner.

Main circuit board 20 is an example of a circuit board.

As illustrated in FIGS. 1B to 1E, flash device 40 is accommodated in a right end of exterior cover 11 so as to be capable of popping up. Allowing flash device 40 to pop up suppresses vignetting of flash light due to interchangeable lens 5.

1-3. Detailed Configuration of Flash Device

Flash device 40 includes, as illustrated in FIG. 1A, light emitting unit 41, flash circuit board 42, main capacitor 43, first wire 42a for electrically connecting flash circuit board 42 and main capacitor 43, second wire 42b for electrically connecting main capacitor 43 and light emitting unit 41, and casing 44. Light emitting unit 41 includes a xenon light emitting tube and a trigger coil. Flash circuit board 42 includes an electric circuit. Flash circuit board 42 controls light emitting unit 41 and main capacitor 43. Specifically, flash circuit board 42 boosts a voltage supplied from main circuit board 20 to supply the voltage, via first wire 42a, to main capacitor 43. Flash circuit board 42 outputs a trigger signal to light emitting unit 41. When power is supplied to the trigger coil based on a trigger signal output from flash circuit board 42, electric charges accumulated in main capacitor 43 are supplied, via second wire 42b, to light emitting unit 41, electricity is discharged between terminals of the xenon light emitting tube of light emitting unit 41, and flash light is emitted. Main capacitor 43 is an example of a capacitor.

Flash circuit board 42 is accommodated in casing 44. Casing 44 is a fire enclosure. In other words, casing 44 is made of a fire-resistant (V-0 or higher in a UL94 standard) resin. First wire 42a between flash circuit board 42 and main capacitor 43 and second wire 42b between main capacitor 43 and light emitting unit 41 are high-voltage wires in which a current having a relatively higher voltage flows. Light emitting unit 41 moves between a storage position and a pop-up position.

1-4. Operation of Mechanical Shutter

Mechanical shutter 250 is a curtain unit including front curtain 252 and rear curtain 253, and alternatively opens and closes the aperture. Since camera system 100 is a mirror-less camera, in order to recognize a subject image and perform framing, a photographer is required to cause the subject image seen through lens group 51 of interchangeable lens 5 to be formed on CMOS image sensor 30 and to check a live view image. Therefore, in photographing using the mechanical shutter (hereinafter referred to as mechanical shutter photographing), when the photographer performs framing, front curtain 252 and rear curtain 253 of mechanical shutter 250 are kept evacuated from the aperture. When the photographer then presses shutter button 11a, front curtain 252 once closes after predetermined photography ready operations including auto-focusing and photometry. As a result, the electric charges of CMOS image sensor 30 are reset. Next, to shift to an actual exposure operation, front curtain 252 starts opening, and, based on a result of the photometry described above, rear curtain 253 starts closing. At this time, front curtain 252 and rear curtain 253 form a slit, and accordingly CMOS image sensor 30 can capture the subject image with appropriate exposure. Upon end of the photographing, the subject image based on accumulated electric charges is read from CMOS image sensor 30. At this time, since CMOS image sensor 30 should be light-shielded, rear curtain 253 is kept closed. When reading of the subject image from CMOS image sensor 30 ends, and rear curtain 253 opens, front curtain 252 and rear curtain 253 are accordingly both open, and, similar or identical to the framing described above, live viewing again becomes possible.

Next, photographing using the electronic front curtain (hereinafter referred to as electronic front curtain photographing) will now be described herein. In electronic front curtain photographing, front curtain 252 described above is kept open. In the electronic front curtain photographing, CMOS image sensor 30 is controlled by controller 401 to sequentially reset accumulated electric charges for parallelism with a trajectory of a closing operation of rear curtain 253. In other words, in the electronic front curtain photographing, a mechanical closing operation of front curtain 252 is achieved, instead of an operation for electronically resetting electric charges.

1-5. Photographing Control of Camera Main Body

Next, photographing control of camera main body 1 will now be described herein with reference to FIGS. 3, 4, and 5. Description of widely known mechanical shutter photographing using front curtain 252 and rear curtain 253 is omitted in here, but photographing using the electronic front curtain and rear curtain 253 (hereinafter referred to as electronic front curtain photographing) will now be described herein in detail. Specifically, controller 401 controls components of camera main body 1 to perform photographing control described below.

Figure 3:
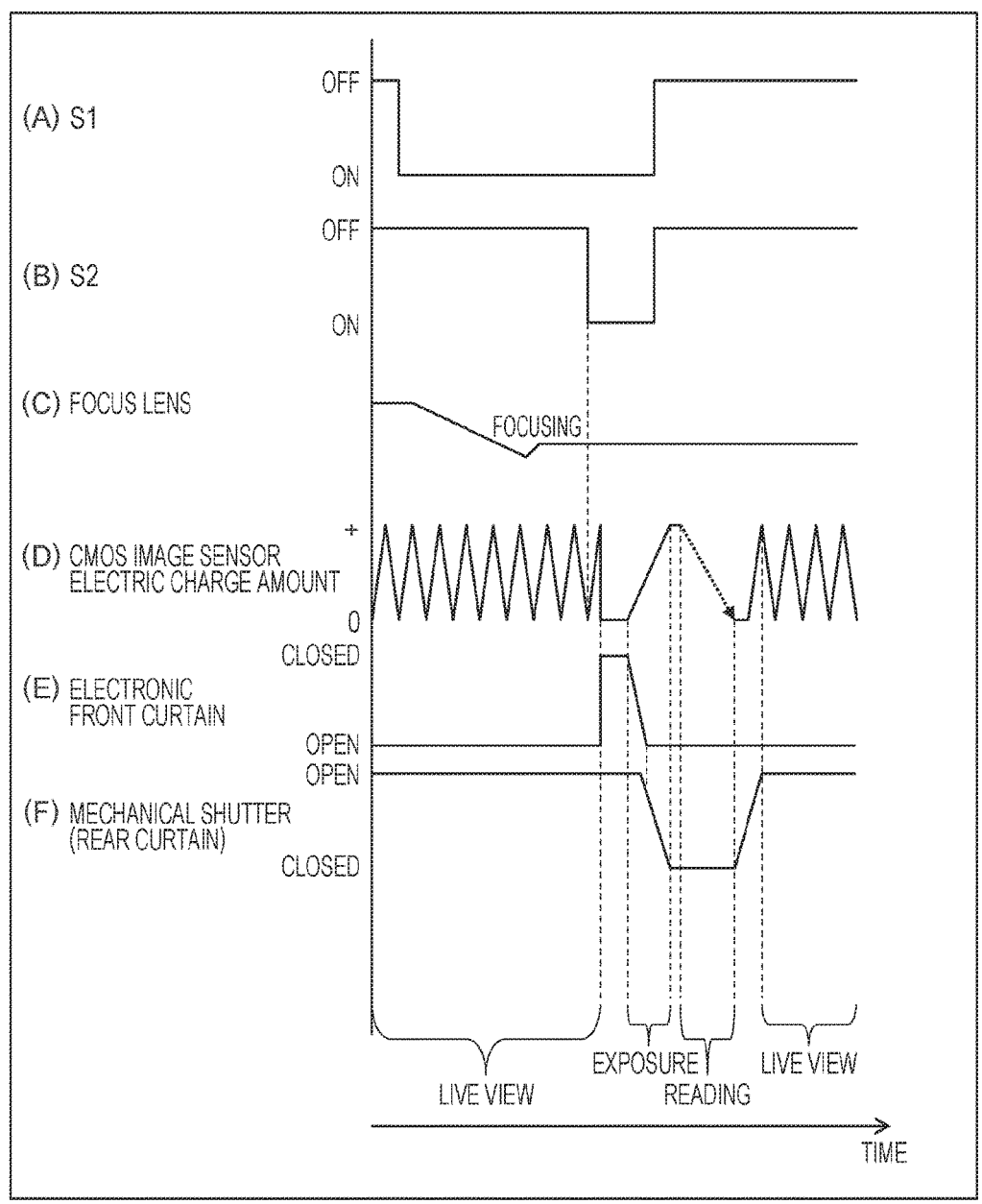
FIG. 3 is a time chart of photographing control in normal photographing in electronic front curtain photographing.

FIG. 3 is a time chart of photographing control in normal photographing (no flash) in electronic front curtain photographing. FIG. 4 is a time chart of photographing control in flash photographing in electronic front curtain photographing. FIG. 5 is a time chart of photographing control in slow synchronous photographing in electronic front curtain photographing.

Figure 4:
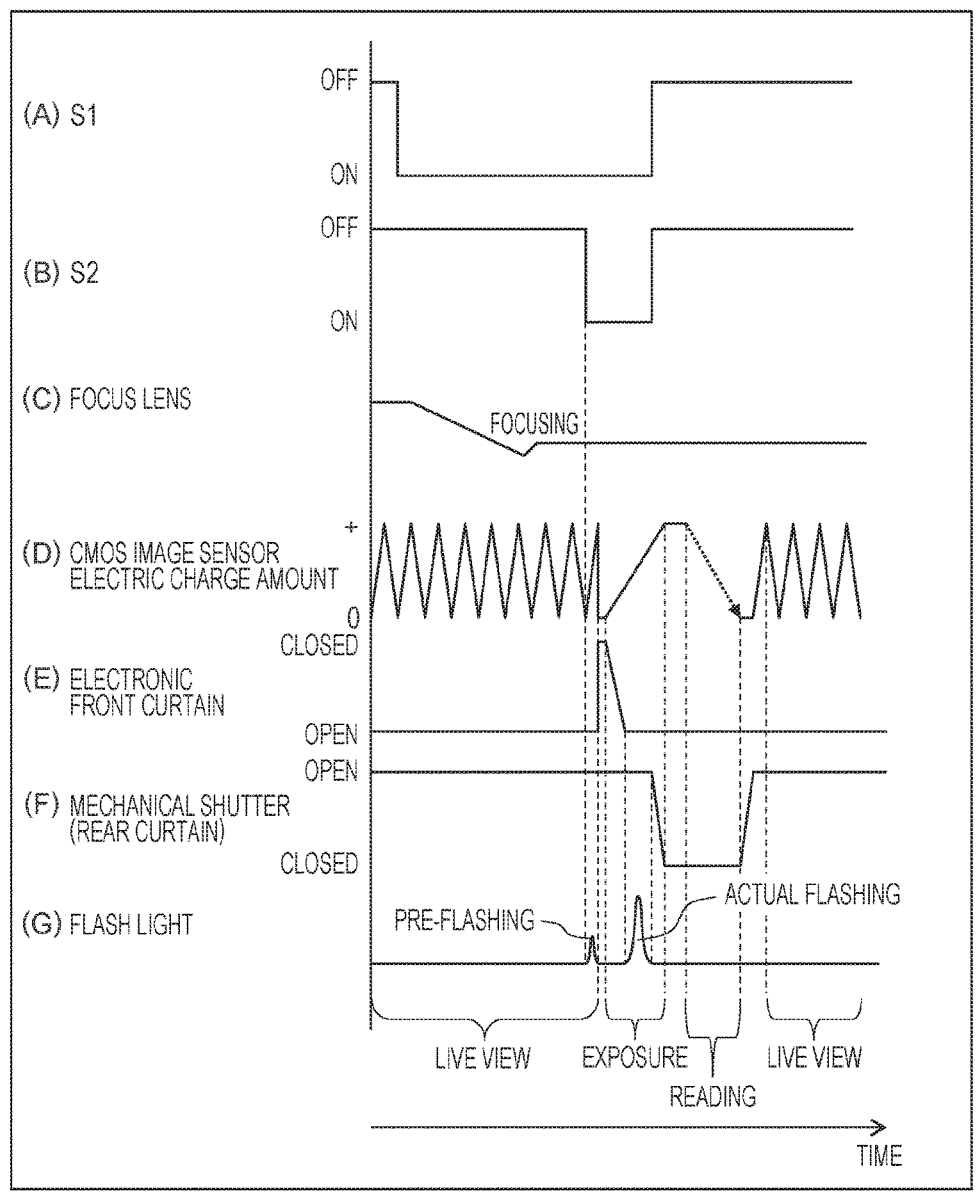
FIG. 4 is a time chart of photographing control in flash photographing in electronic front curtain photographing.
Figure 5:
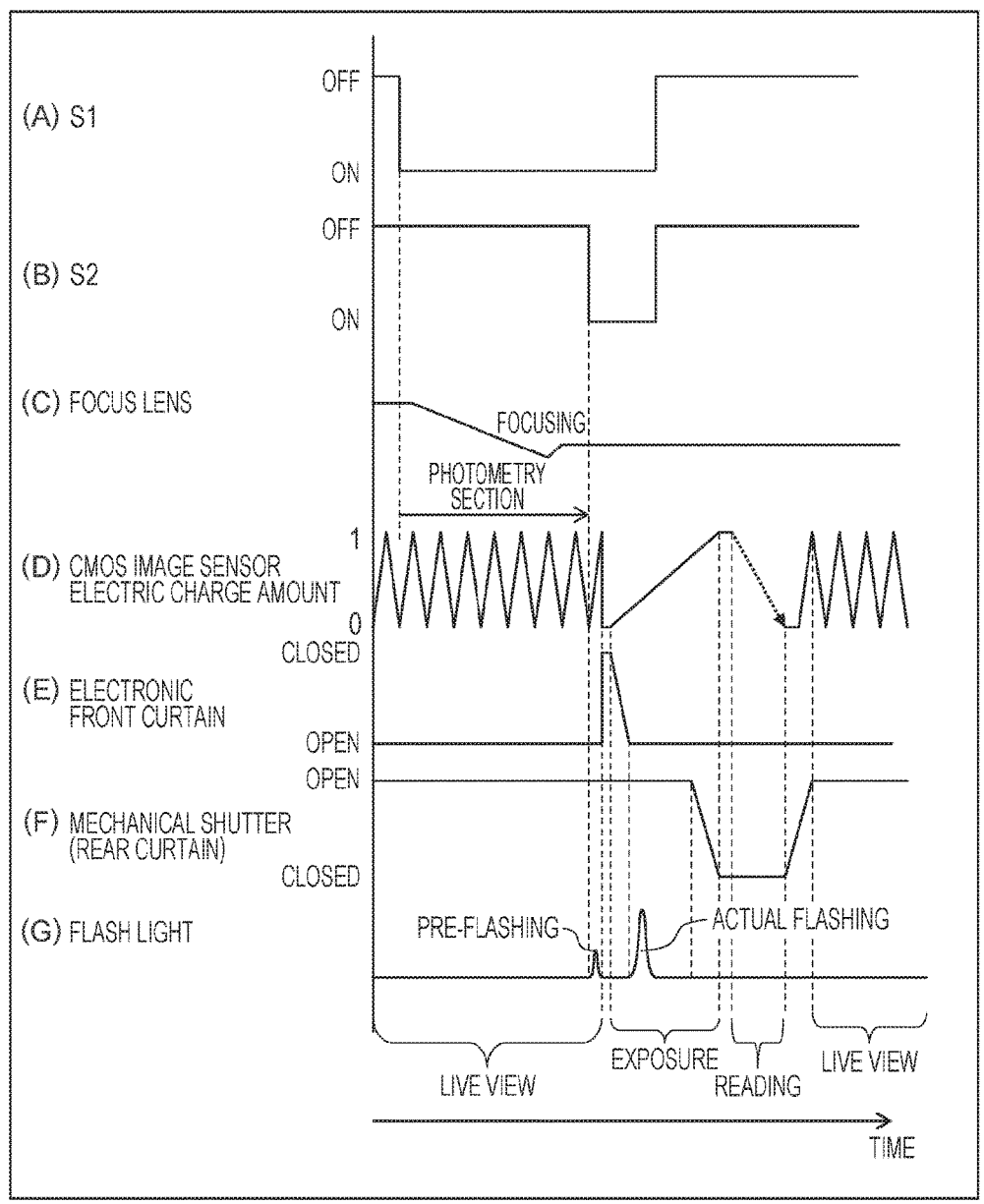
FIG. 5 is a time chart of photographing control in slow synchronous photographing in electronic front curtain photographing.

In FIGS. 3, 4, and 5, from top in order, (A) illustrates a change of signal S1, and (B) illustrates a change of signal S2. Signals S1 and S2 are signals output when shutter button 11a is operated. When shutter button 11a is half-pressed, signal S1 is output (signal S1 turns on (ON)). When shutter button 11a is fully pressed, signal S2 is output (signal S2 turns on (ON)). When signal S2 is output, signal S1 is kept output, (C) illustrates a position of a focus lens. (D) schematically illustrates an outline of timings of resetting and reading electric charges in CMOS image sensor 30. A lower end (0) of a vertical axis of (D) shows that electric charges in all lines have been reset, and a total amount of electric charges accumulated in CMOS image sensor 30 increases toward an upper end (+). In other words, the vertical axis of (D) does not indicate an amount of electric charges (presence/absence) in a particular line in CMOS image sensor 30. (B) illustrates a behavior image of the electronic front curtain. An upper end (closed) of a vertical axis of (E) shows that the electronic front curtain is fully closed, and a lower end (open) shows that the electronic front curtain is fully open. (F) illustrates an operation of the mechanical shutter. An upper end (open) of a vertical axis of (F) shows that the rear curtain is fully open, and a lower end (closed) shows that the rear curtain is fully closed. In FIGS. 4 and 5, (G) illustrates a flashing timing of the flash device.

1-6-1. Photographing Using Both Electronic Front Curtain and Mechanical Rear Curtain Electronic front curtain photographing using both the electronic front curtain and the rear curtain of the mechanical shutter will now be described herein with reference to FIG. 3. In the first exemplary embodiment, the rear curtain refers to rear curtain 253 of mechanical shutter 250 illustrated in FIG. 1, and also refers to, as required, the rear curtain or a mechanical rear curtain. In electronic front curtain photographing illustrated in FIG. 3, no flash is used.

When shutter button 11a is half-pressed, and signal S1 reaches an ON state, control IC 21 (controller 401) performs auto-focusing (hereinafter referred to as "AF") based on a known contrast method. In other words, control IC 21 drives the locus lens, performs a contrast evaluation for an image to be captured by CMOS image sensor 30, finds a focusing position, and moves the focus lens to the focusing position. Simultaneously, control IC 21 performs photometry for a subject image. Based on this photometry, an exposure time is determined.

Until signal S2 reaches an ON state, control IC 21 causes display 13 to display a live view image. At this time, mechanical rear curtain 253 is open.

When shutter button 11a is fully pressed, and signal S2 is output, control IC 21 causes, via CMOS circuit board 31, CMOS image sensor 30 to perform an electronic front curtain shutter operation based on a rolling shutter method. Specifically, when signal S2 is output, after once simultaneously resetting all electric charges, CMOS image sensor 30 then resets electric charges so that the aperture sequentially opens for photographing from a line at an upper end to a line at a lower end. Upon elapse of a predetermined exposure time from when the resetting of electric charges starts for photographing, control IC 21 causes mechanical shutter 250 to operate to cover the aperture. In other words, mechanical shutter 250 is functioning as a rear curtain. After incident light from the subject to CMOS image sensor 30 is blocked as described above, control IC 21 executes reading of electric charges in CMOS image sensor 30. The aperture is an opening portion for allowing incident light to an optical system to pass through.

When the reading of electric charges in CMOS image sensor 30 ends, control IC 21 causes mechanical shutter 250 to open the aperture to start again displaying of a live view.

In the electronic front curtain photographing illustrated in FIG. 3, by sequentially changing a region in which electric charges will be reset, a direction toward which the aperture is closed through resetting of electric charges) matches to a direction toward which the aperture is closed by mechanical rear curtain 253 (i.e., a direction when the aperture is closed from a certain, side to another side). In the electronic front curtain photographing illustrated in FIG. 3, a speed of resetting of electric charges (a resetting speed) matches to a curtain speed of mechanical shutter 250 (a speed a t which rear curtain 253 moves forward). Exposure times for the lines are therefore kept constant.

1-6-2. Flash Photographing Using Both Electronic Front Curtain and Mechanical Rear Curtain Next, flash photographing using flash light in electronic front curtain photographing using both the electronic front curtain and the mechanical rear curtain will now be described herein with reference to FIG. 4.

In flash photographing using both the electronic front curtain and the mechanical rear curtain, processing until when shatter button 11a is fully pressed is identical to corresponding processing in the photographing using both the electronic front curtain and the mechanical rear curtain illustrated in FIG. 3.

When shutter button 11a is fully pressed, and signal S2 is output, control IC 21 causes flash device 40 to perform pre-flashing to obtain a light emission amount for appropriate exposure. Next, control IC 21 causes, via CMOS circuit board 31, CMOS image sensor 30 to perform an electronic front curtain shutter operation based on the rolling shutter method. In other words, CMOS image sensor 30 sequentially resets electric charges so that the aperture opens from the line at the upper end to the line at the lower end. At this time, the direction toward which the aperture is open through resetting of electric charges matches to a direction toward which the aperture is closed by mechanical shutter 250, as well as a resetting speed and a curtain speed of mechanical shutter 250.

When resetting of electric charges in ail the pixels ends, control IC 21 causes flash device 40 to perform actual flashing (flash) with the light emission amount obtained through the pre-flashing. After the actual flashing, control IC 21 causes mechanical shutter 250 to operate and cover the aperture. After the aperture is covered, control IC 21 executes reading of electric charges in CMOS image sensor 30.

When the reading of electric charges ends, control IC 21 causes mechanical shutter 250 to open the aperture to start again displaying of a live view.

With the electronic front curtain and the mechanical rear curtain, since curtain, speeds of the front curtain and the rear curtain can be increased, flash photographing with appropriate exposure can be performed even when actual flashing, is performed after the front curtain is fully open, and, after the actual flashing, covering of the rear curtain is started.

1-6-3. Slow Synchronous Photographing

Next, slow synchronous photographing will now be described herein with reference to FIG. 5. Slow synchronous photographing refers to photographing that is performed at a relatively slower shutter speed using flash light, and also refers to photographing for simultaneously capturing, with appropriate exposure, a subject to which flash light does not reach, such as a night view, and a relatively nearer subject to which flash light reaches.

Basic processing from when shutter button 11a is fully pressed to when the flash device is caused to perform pre-flashing is identical to basic processing of normal flash photographing in electronic front curtain photographing. In slow synchronous photographing, however, when shutter button 11a is half-pressed, photometry to a subject image under ambient light is performed to determine a time during which CMOS image sensor 30 accumulates electric charges. In FIG. 5, for example, a time for accumulating electric charges is specified to a range from a point when the electronic front curtain starts to open to a point when the rear curtain starts to close.

At pre-flashing, control IC 21 obtains a light emission amount for appropriate exposure for a relatively nearer subject. After that, control IC 21 sequentially resets electric charges in all the pixels of CMOS image sensor 30 so that the aperture sequentially opens. Immediately after the resetting, control IC 21 causes flash device 40 to perform actual flashing with the light emission amount obtained through the pre-flashing. Upon elapse of the time for accumulating electric charges, control IC 21 causes mechanical shutter 250 to move rear curtain 253 to a position at which a closed state is achieved to cover the aperture. In other words, mechanical shutter 250 is functioning as a rear curtain. After light entering from the subject to CMOS image sensor 30 is blocked as described above, control IC 21 executes reading of electric charges in CMOS image sensor 30.

When the reading of electric charges ends, control IC 21 causes mechanical shutter 250 to open the aperture to start again displaying of a live view.

In slow synchronous photographing, a time for accumulating electric charges is set, and an exposure time extends longer than an exposure time in normal flash photographing in electronic front curtain photographing. Also in the slow synchronous photographing, by closing mechanical shutter 250 after flashing has been started, excessive subject light can be blocked when electric charges are read. Exposure during reading can therefore be prevented, and flash photographing with appropriate exposure can be performed.

1-7. Necessity of Increased Flash Synchronization Shutter Speed

In flash photographing using both the mechanical rear curtain and the electronic front curtain, as described above, flashing using the flash device is required to be performed in a period from when the front curtain (the electronic front curtain) evacuates from the aperture to when the rear curtain appears over the aperture. Since, when environment luminance is extremely low, flash light can be emitted only to a subject lying at a distance to which the flash, light can reach, and thus a difference found in a captured image due to an exposure time determined by the front curtain and the rear curtain is smaller. However, in daytime synchronization (daylight synchronization) flash photographing where, in a state that environment luminance is higher, namely, in a daytime for example, flash light is emitted to a nearer main, subject and the main subject and a background subject are simultaneously captured, an exposure time is determined, regardless of the flash light, based on luminance of the background subject, an available diaphragm value, and an imaging international organization for standardization (ISO) sensitivity. To capture an intended image, a photographer determines a diaphragm value based on a depth of field, as well as determines an ISO sensitivity based on various factors including noise. However, an exposure time should unambiguously be determined at this time. When the exposure time determined at this time is shorter than a time equivalent to a flash synchronization shutter speed, the photographer is not able to allow the flash device to flash, but is required to change the diaphragm value and the ISO sensitivity, and therefore might not able to achieve photographing intended by himself or herself. A flash synchronization shutter speed refers to a fastest shutter speed at which flash light can be synchronized. In other words, a flash synchronization shutter speed refers to a fastest shutter speed at which the flash device can flash in a period from when resetting of electric charges with the electronic front curtain ends during photographing to when the closing operation of the mechanical rear curtain starts (a period during which the aperture fully opens). A shutter speed refers to an exposure time, and a faster shutter speed means a shorter exposure time. When flashing with the flash device cannot be achieved in a situation, such as a back-light scene, where a background subject is so bright and a difference in luminance between the background subject and a main subject is greater, adjusting exposure in accordance with the luminance of the background subject could darken the main subject, whereas adjusting the exposure to the main subject could lead to halation in the background subject. As a result, a photographer would not attain photographing as intended. On the other hand, when a flash synchronization shutter speed is reduced in order to emit flash light toward a main subject under an environment where a background subject is bright and a difference in luminance between the background subject and the main subject is great, a diaphragm should be narrowed more than necessary, or ISO sensitivity should be reduced so greatly. However, narrowing the diaphragm more than necessary could lead to a deeper depth of field than a depth intended by the photographer, and therefore deterioration of image quality, such as a blurred image through a diffraction phenomenon, might occurs, or the diaphragm might not physically be narrowed. Since reduction in ISO sensitivity is limited, a degree of freedom for a photographer might in any case be decreased. A speed at which electric charges are reset has a high degree of freedom when an electronic front curtain is used. By using a degree of freedom of a speed at which electric charges in an electronic front curtain are reset, a method for increasing a flash synchronization shutter speed and reducing a feeling of wrongness in a captured image has been designed.

1-8. First Method for Increasing Flash Synchronization Shutter Speed

Figure 6A:
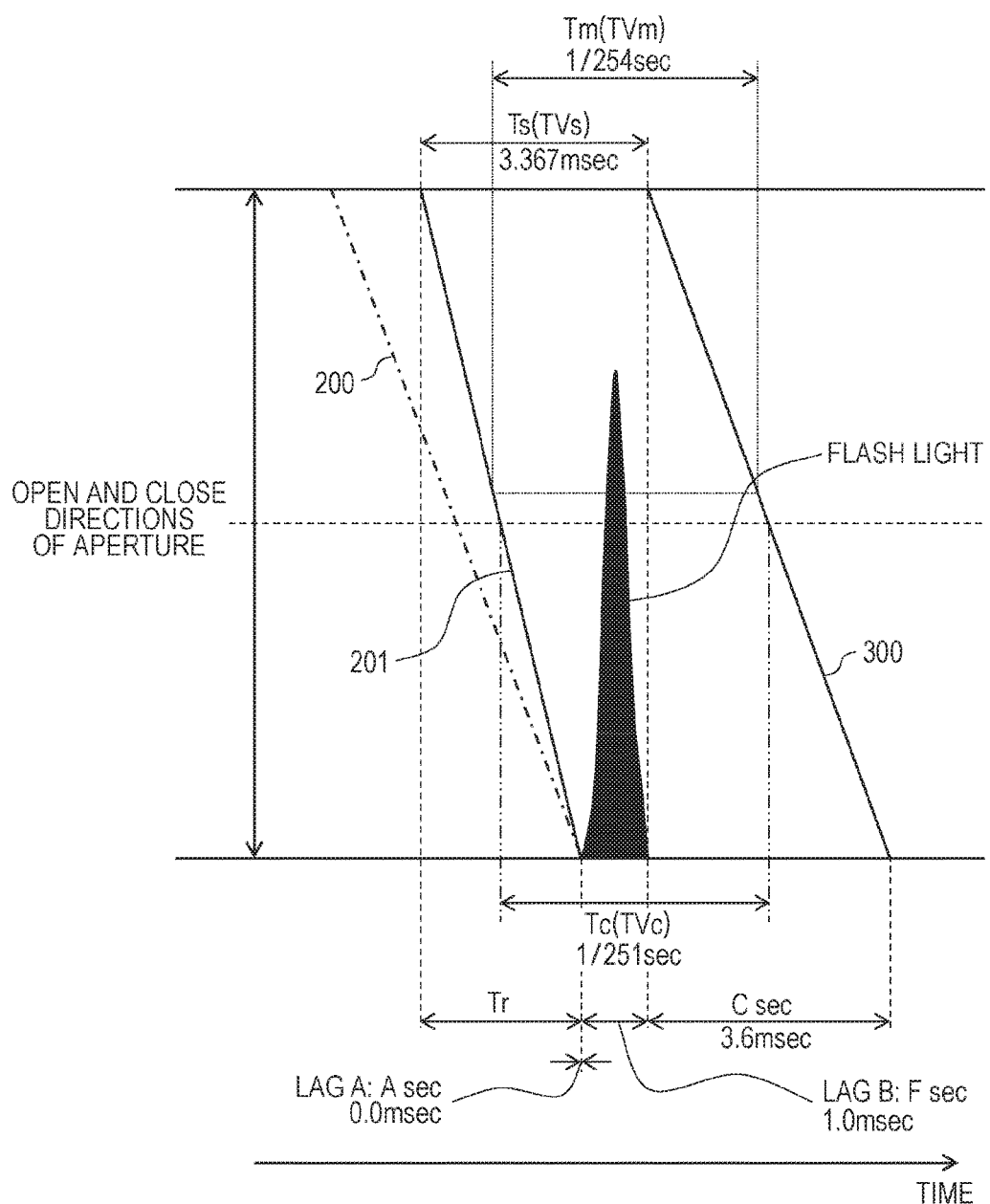
FIG. 6A is a time chart illustrating operations of curtains and flashing of a flash device when a first method for increasing a flash synchronization shutter speed, according to the first exemplary embodiment, is executed.

With reference to FIG. 6A, a first method for increasing a flash synchronization shutter speed according to the first exemplary embodiment will now be described herein. Electronic front curtain trajectory 200 indicated by a dashed line in FIG. 6A represents a trajectory of the electronic front curtain in flash photographing in electronic front curtain photographing as illustrated in FIG. 4, other than slow synchronous photographing. Rear curtain trajectory 300 represents a trajectory of light shielding for CMOS image sensor 30 corresponding to the closing operation of the mechanical rear curtain. The electronic front curtain is controlled by the control IC so that electronic front curtain trajectory 200 follows rear curtain trajectory 300. For example, in here, a time during which the rear curtain covers the aperture downward in the vertical direction (or upward) (covering time) is specified, to 3.6 m seconds, and lag B of a flash time from when the flash device starts flashing to when the flash device ends the flashing is specified to 1.0 m second. Since a timing at which the electronic front curtain ends resetting of electric charges (hereinafter referred to as electric charges resetting end timing) and a timing at which the flash device starts flashing (hereinafter referred to as a flash start timing) can electrically correctly be set, lag A that is a time difference between the electric charge resetting end timing and the flash start timing can be set to 0 m seconds. Therefore, an exposure time can be obtained as illustrated below:

$$0+1.0+3.6=4.6 \text{ milliseconds}.$$

When this value is converted into a time value (TV), TV obtains a following value:

$$TV=\log_2 1/(4.6 \div 1000)=7.76415.$$

Therefore, a physically possible flash synchronization shutter speed in normal photographing is a value shown below:

$$1/2^{7.76415}=1/217 \text{ seconds}.$$

Next, electronic front curtain trajectory 201 is a trajectory of the electronic front curtain when a difference in exposure time for a background subject of an image to be captured is set so as to be a difference in exposure time corresponding to 0.45 exposure value (EV) allowed in a standard (JIS B 7091 Camera shutter, ISO 516). Under conditions of a flash time, lag B of a flash time, and lag A, which are identical to conditions used in a case for describing electronic front curtain trajectory 200, a calculation example where a difference in exposure amount in the vertical, direction in all the pixels of CMOS image sensor 30 reaches 0.45 EV will now be described herein.

As described above, a necessary condition is that the rear curtain starts running (starts covering) alter 1 m second from an electric charge resetting end timing, and a sufficient condition is that a difference in exposure amount in the vertical direction of the above described background subject is 0.45 EV.

When an exposure time is set to 4.6 m seconds, an exposure amount when starting exposure is set to be 0.45 EV darker than an exposure amount at a timing immediately before the exposure ends. When TV for an exposure start line is specified to TVs ($1/2^{TVs}$=Ts second(s) in time conversion), TVs can be obtained in accordance with an equation shown below:

$$TVs = TV + 0.45$$
$$= 7.76415 + 0.45$$
$$= 8.21415.$$

Therefore, TV indicative of a geometric mean of TV for all the lines, i.e., TVm, ($1/2^{TVm}$=Tm second(s) in time conversion), can be obtained in accordance with an equation shown below:

TVm=(TVs+TV)/2=7.98915.

That is, Tm is a value shown below:

Tm=1/254 seconds.

As described above, while the JIS standard is satisfied, a flash synchronization shutter speed can be increased.

Exposure time Tc for a central line, that is regarded as a center in the vertical direction of all the pixels of CMOS image sensor 30 obtains a value shown below:

$$Tc = (Ts + T)/2$$
$$= 1/251 \text{ seconds.}$$

In other words, a flash synchronization shutter speed can also be increased based on an exposure time for the central line. In the first exemplary embodiment, a flash synchronization, shutter speed and exposure time Tc for the central line are basically regarded as identical.

In general, when a covering time required by the mechanical rear curtain to cover the aperture is specified to C second(s), lag B of a flash time by the flash device is specified to F second(s), and lag A is specified to A second(s), exposure time T (a flash synchronization shutter speed that is a physically possible, fastest shutter speed in a conventional exemplary embodiment) can be obtained in accordance with an equation shown below:

T=(C+F+A) second(s).

When exposure time T second(s) is converted into TV, TV can be obtained in accordance with an equation shown below:

TV=−$\log_2$(C+F+A).

Next, electronic front curtain trajectory 201 represents a trajectory when an allowable value of an exposure time in a vertical direction of a background subject of an image to be captured (a difference in EV) is set to $1/2^x$ second(s) (x in EV conversion).

As described above, a necessary condition is that rear curtain 253 starts covering after F second(s) from an electric charge resetting end timing, and a sufficient condition is that a difference in exposure time in the vertical direction of the above described background subject is $1/2^x$ second(s) (x in EV conversion).

When exposure is started based on (C+F+A) second(s), a setting achieving 1/2x second(s) (x in EV conversion) darker should be made. When TV at a time when exposure is started is specified to TVs ($1/2^{TVs}$=Ts in time conversion), TVs can be obtained in accordance with an equation shown below:

TVs=TV+x.

Therefore, TVc ($1/2^{TVc}$=Tc second(s) in time conversion) that is central TV corresponding to flash synchronization shutter speed Tc can be obtained in accordance with equation (1) shown below:

$$TVc = (TVs + TV)/2 \tag{1}$$
$$= x/2 + TV$$
$$= x/2 - \log_2(C + F + A).$$

Exposure time Tc for the central line (−$\log_2$ Tc in TV conversion) can be obtained in accordance with equation (2) shown below:

$$Tc = (T + Ts)/2 \tag{2}$$
$$= T/2 + 2^{-TVs}/2$$
$$= T/2 + 2^{-(TV+x)}/2$$
$$= T/2 + (T \times 2^{-x})/2$$
$$= (1 + 2^{-(1+x)}) \times T/2.$$

In other words, a flash synchronization shutter speed can also be increased based on an exposure time for the central line.

Figure 6B:
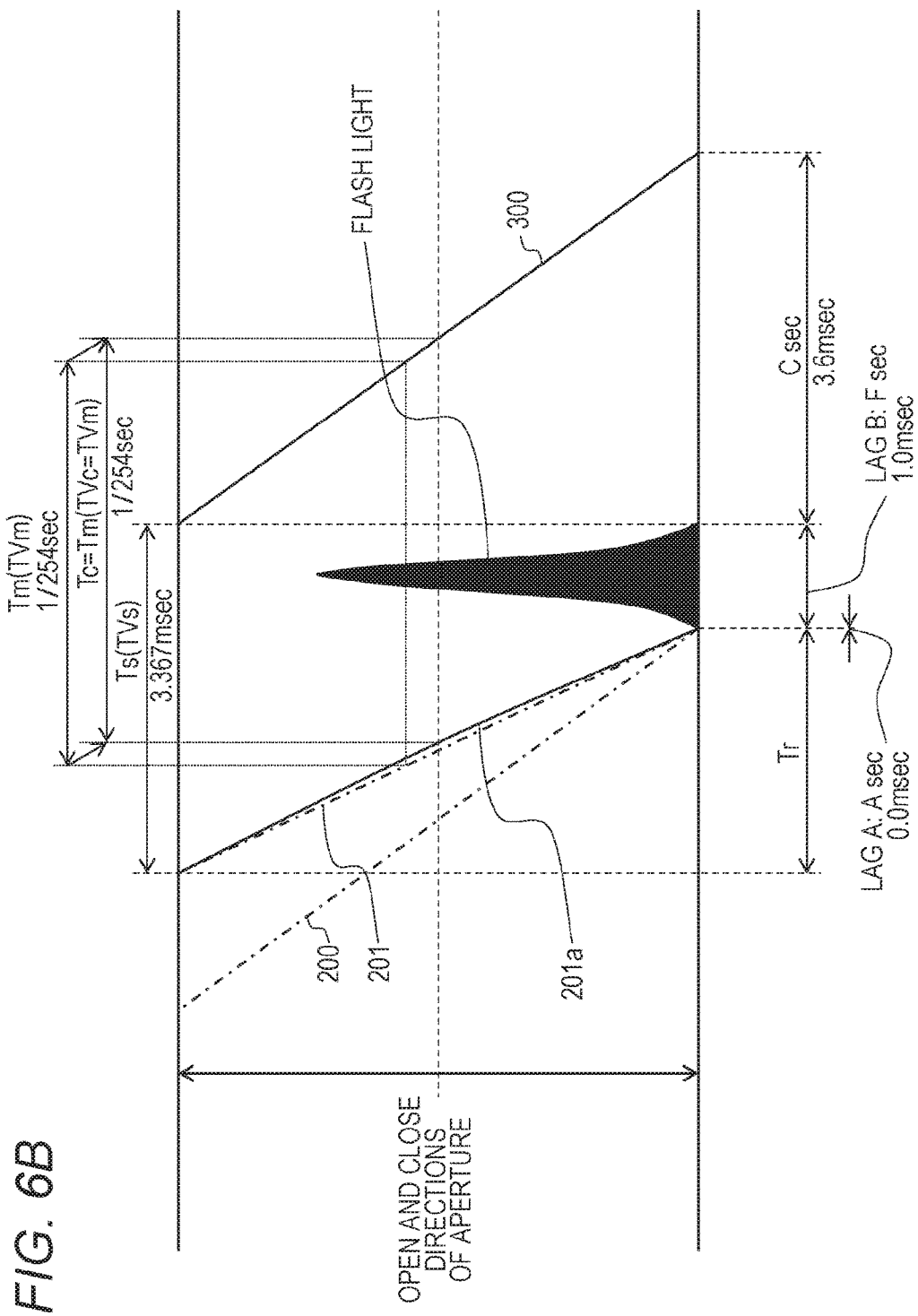
FIG. 6B is a time chart illustrating operations of the curtains and flashing of the flash device when a first method for increasing a flash synchronization shutter speed, according to an exemplary modification of the first exemplary embodiment, is executed.

As illustrated in FIG. 6B, when CMOS image sensor 30 is controlled so that electronic front curtain trajectory 201a renders a curve trajectory, central TV denoted by Tm as average TV matches to TV for the central line of CMOS image sensor 30 denoted by TVc, and thus a more natural image can be captured. In FIG. 6B, CMOS image sensor 30 is controlled so that electronic front curtain trajectory 201a renders, instead of a linear trajectory, a curve trajectory including values such as a power of 2 and a higher order term. Resetting times, at which resetting of electric charges in a start line (e.g., the upper end of CMOS image sensor 30) and an end line (e.g., the lower end of CMOS image sensor 30) is executed, illustrated, in electronic front curtain trajectory 201a are identical to resetting times for a start line and an end line, illustrated in electronic front curtain trajectory 201 rendering a linear trajectory illustrated in FIG. 6A, but resetting times for other lines, illustrated in electronic front curtain trajectory 201a, differ from reset times for other lines, illustrated m corresponding electronic front curtain trajectory 201.

In other words, as illustrated in FIGS. 6A and 6B, an instruction may be given and control may be performed such that, based on an electronic front curtain trajectory of CMOS image sensor 30 (201 in an example illustrated in FIG. 6A, and 201a in an example illustrated in FIG. 6B), after elapse of electric charge resetting time Tr second(s) that is a time from start of resetting of electric charges in an exposure start line (each of the lines at the upper ends in the examples illustrated in FIGS. 6A and 6B) to end of resetting of electric charges in a final line (each of the lines at the lower ends in the examples illustrated in FIGS. 6A and 6B), the flash device is instructed to start flashing after A second(s), and rear curtain 253 of mechanical shutter 250 is caused to perform covering after F second(s) from when the flash device starts the flashing, and then to end the covering after C second(s).

When an exposure time for the exposure start line is specified to Ts second(s), electric charge resetting time Tr can be obtained in accordance with equation (3) shown below.

$$Tr = Ts - (A + F) \quad (3)$$
$$= 2^{-(TV+x)} - (A + F)$$
$$= 2^{-TV} \times 2^{-x} - (A + F)$$
$$= (A + F + C) \times 2^{-x} - (A + F)$$

In other words, a trajectory of the electronic front curtain is not limited to electronic front curtain trajectory 201 illustrated in FIG. 6A and 201a illustrated in FIG. 6B, but EV may have a predetermined difference in the vertical direction, and an electronic front curtain trajectory of CMOS image sensor 30 may be controlled so that a time from resetting of electric charges in the line at the upper end, i.e., start of first exposure, to resetting of electric charges in the line at the lower end, i.e., start of final exposure (a time until the aperture fully opens) is Tr second(s).

1-9. Second Method for Increasing Flash Synchronization Shutter Speed

As long as a reverse inclination shading correction with a half value of an inclination of EV (e.g., 0.45 EV) or greater will be performed on a captured image in image processor 403, a difference in exposure amount in a vertical direction of a background subject can be specified to 0.9 EV, using an idea similar or identical to an idea described in "1-8. First Method for Increasing Flash Synchronization Shutter Speed."

Figure 7A:
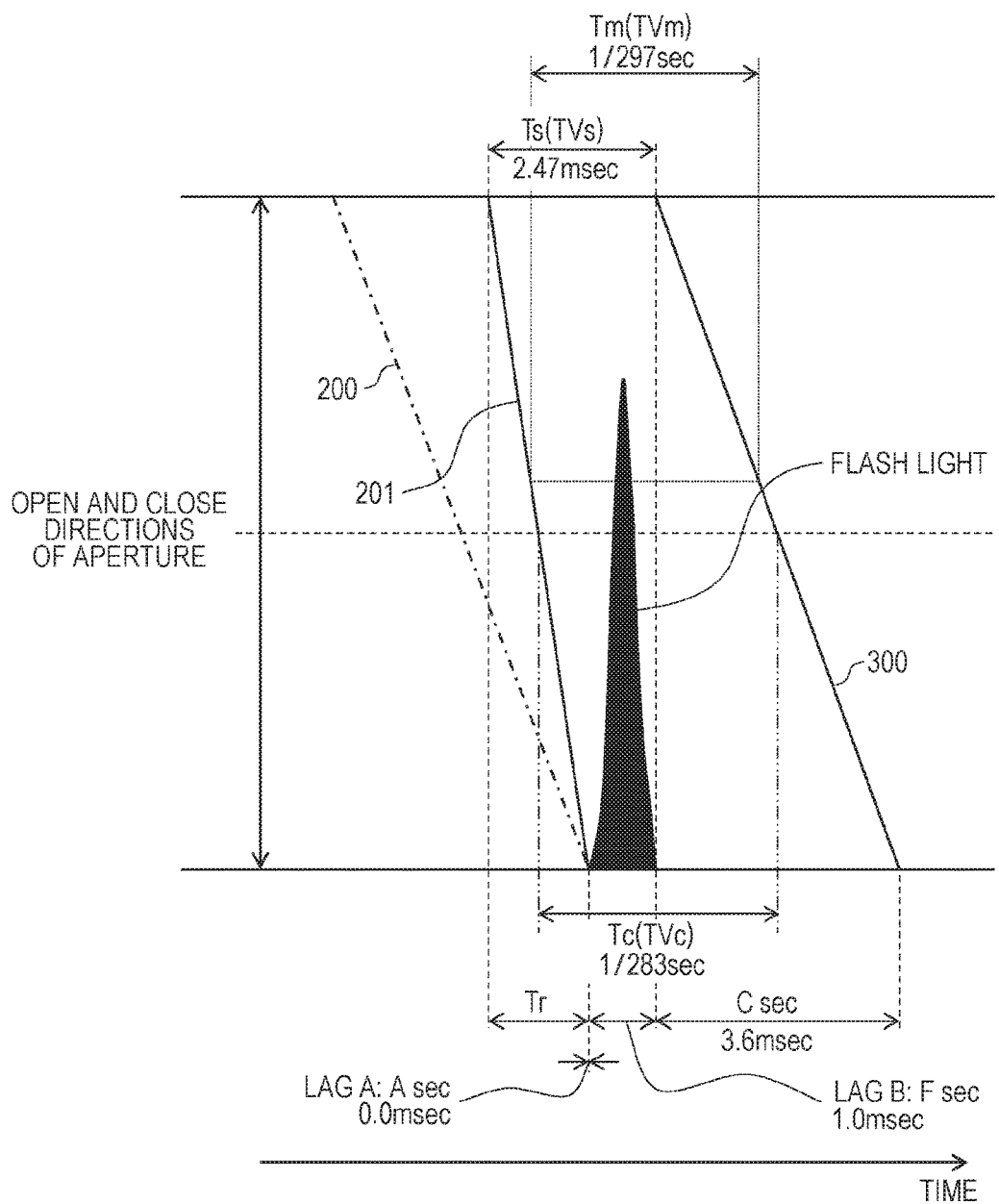
FIG. 7A is a time chart illustrating operations of the curtains and flashing of the flash device when a second method for increasing a flash synchronization shutter speed, according to the first exemplary embodiment, is executed.

Specifically, as illustrated in FIG. 7A, when TV for an exposure start line is specified to TVs ($1/2^{TVs}$=Ts second(s) in time conversion), and TV for an exposure final line is specified to TV ($1/2^{TV}$=T second(s) in time conversion), since a difference in EV is 0.9 EV, TVs can be obtained in accordance with an equation shown below:

$$TVs = TV + 0.9$$
$$= 7.76415 + 0.9$$
$$= 8.66415.$$

Therefore, TVm that is a geometric mean value of TV ($1/2^{TVm}$=Tm in time conversion), can be obtained in accordance with an equation shown below:

$$TVm=(TVs+TV)/2=8.21415,$$

that is, $$Tm=1/297 \text{ second(s)}.$$

By applying a shading correction in an amount of 0.45 EV from the lower end to the upper end of CMOS image sensor 30, EV for the background subject will have an inclination equivalent to a difference in EV of 0.45 EV in the vertical direction, as described in "1-8. First Method for Increasing Flash Synchronization Shutter Speed." EV for a main subject will have an inclination equivalent to a difference in EV of 0.45 EV in a direction opposite to the background subject (upward).

Exposure time Tc for the central line that is regarded as the center in the vertical direction of all the pixels of CMOS image sensor 30 is a value shown below:

$$Tc = (Ts + T)/2$$
$$= 1/283 \text{ seconds}.$$

Therefore, a flash synchronization shutter speed can also be increased based on an exposure time for the central line.

In general, when a covering time required by the mechanical rear curtain to cover t be aperture is specified to C second(s), lag B of a flash time by the flash is specified to F second(s), and lag A is specified to A second(s), central TV denoted by TVc, as a flash synchronization shutter speed, can be obtained in accordance with equation (1) shown below, similar, or identical to "1-8. First Method for Increasing Flash Synchronization Shutter Speed":

$$TVc=x/2-\log_2(C+F+A) \quad (1).$$

Figure 7B:
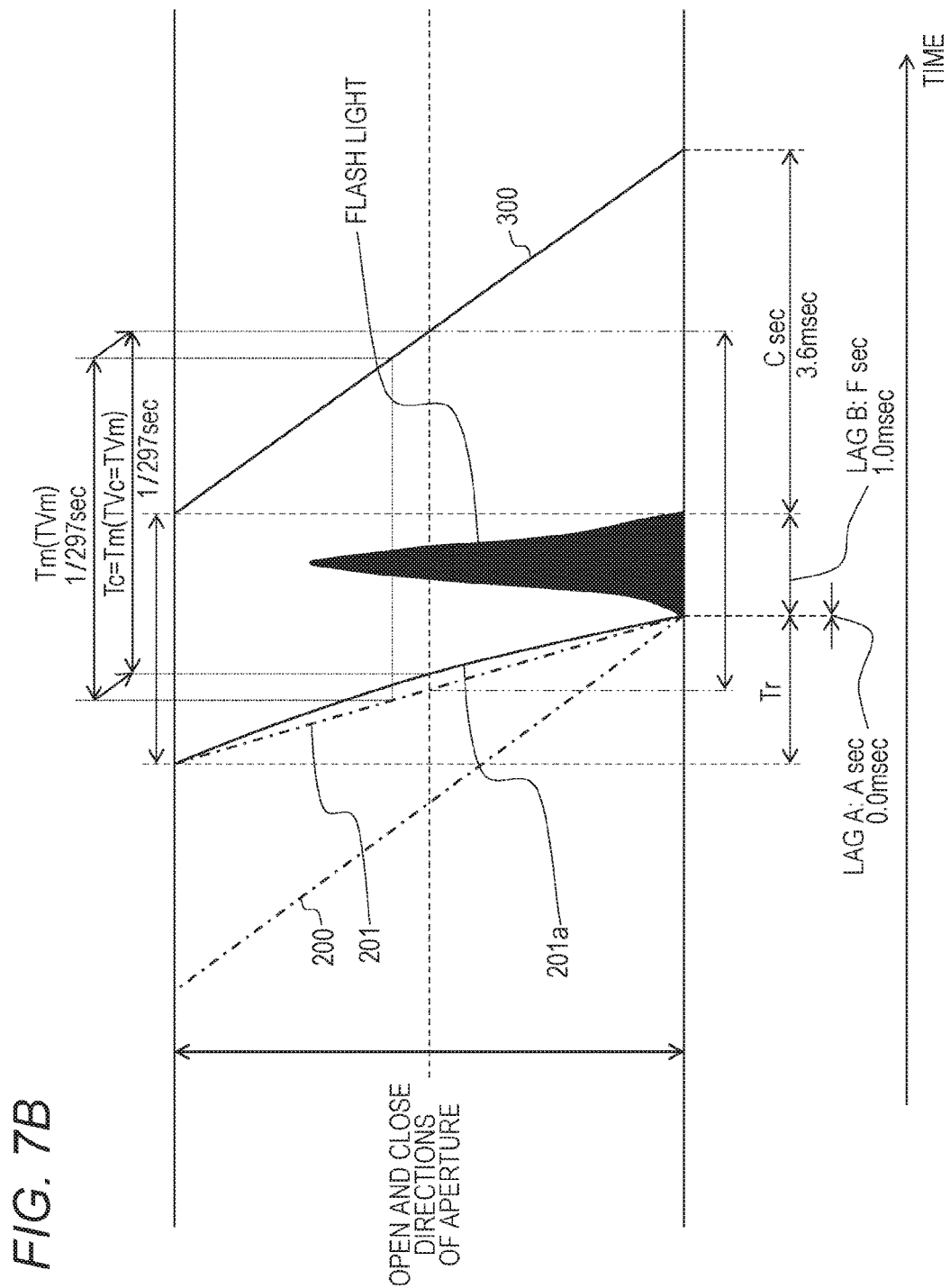
FIG. 7B is a time chart illustrating operations of the curtains and flashing of the flash device when a second method for increasing a flash synchronization shutter speed, according to the exemplary modification of the first exemplary embodiment, is executed.

As illustrated in FIG. 7B, when CMOS image sensor 30 is controlled so that electronic front curtain trajectory 201a renders a curve trajectory, central TV denoted by Tm matches to TV for the central line denoted by TVc, and thus a more natural image can be captured. In FIG. 7B, CMOS image sensor 30 is controlled so as to render, instead of a linear trajectory, a curve trajectory including values such as a power of 2 and a higher order term. Therefore, resetting times for a start line and an end line illustrated in electronic front curtain trajectory 201a are identical to resetting times for a start line and an end line illustrated in electronic front curtain trajectory 201 rendering a linear trajectory illustrated in FIG. 7A. However, resetting times for other lines illustrated in electronic front curtain trajectory 201a differ from resetting times for other lines illustrated in corresponding electronic front curtain trajectory 201.

In other words, as illustrated in FIGS. 7A and 7B, an instruction may be given and a control may be performed such that, based on an electronic front curtain trajectory of CMOS image sensor 30 (201 in an example illustrated in FIG. 7A, and 201a in an example illustrated in FIG. 7B), after elapse of electric charge resetting time Tr second(s) that is a time from start of resetting of electric charges in an exposure start line (each of the lines at the upper ends in the examples illustrated in FIGS. 7A and 7B) to end of resetting of electric charges in a final line (each of the lines at the lower ends in the examples illustrated in FIGS. 7A and 7B), the flash device is instructed to start flashing after A second(s), and rear curtain 253 of mechanical shutter 250 is caused to perform covering after F second(s) from when the flash device starts the flashing, and then to end the covering after C second(s).

When an exposure time for an exposure start line is specified to Ts second(s), electric charge resetting time TV can in here be obtained in accordance with, equation (3) shown below, similar or identical to "1-8. First Method for Increasing Flash Synchronization Shutter Speed":

$$Tr=(A+F+C)\times 2^{-x}-(A+F) \quad (3).$$

In other words, a trajectory of the electronic front curtain is not limited to electronic front curtain trajectory 201 illustrated in FIG. 7A and 201a illustrated in FIG. 7B, but EV may have a predetermined difference in the vertical direction, and an electronic front curtain trajectory of CMOS image sensor 30 may be controlled so that a time from resetting of electric charges in a line, i.e., start of first exposure, to resetting of electric charges in a line, i.e., start of final exposure (a time until the aperture fully opens) is Tr second(s).

1-10. Effects and Other Benefits

Effects and other benefits in the first exemplary embodiment will now be described, herein.

(1) In the first exemplary embodiment, camera main body 1 is camera main body 1 capable of capturing an image by causing the flash device to flash, and includes CMOS image sensor 30 (an example of an imaging element), image processor 403, mechanical shutter 250 (an example of a focal plane shutter), and controller 401 (an example of a controller). CMOS image sensor 30 is capable of accumulating electric charges, and of sequentially resetting the accumulated electric charges in the vertical direction (an example of a first direction) to start exposure, CMOS image sensor 30 captures, during the exposure, a subject image entered via lens group 51 (an example of an optical system) to generate an image signal. Image processor 403 performs predetermined processing on the image signal generated by CMOS image sensor 30 to generate image data. Mechanical shutter 250 at least includes rear curtain 253 for covering CMOS image sensor 30 for ending the exposure. Controller 401 controls CMOS image sensor 30 and mechanical shutter 250. Controller 401 sets electric charge resetting time Tr (or, electronic front curtain trajectory 201) for CMOS image sensor 30 so that EV of CMOS image sensor 30 has a predetermined inclination (so as to render electronic front curtain trajectory 201 having a predetermined inclination with respect to electronic front curtain trajectory 200 that is used in normal photographing and that is set to follow rear curtain trajectory 300). Controller 401 also sets CMOS image sensor covering time C by rear curtain 253 (or, rear curtain trajectory 300) for mechanical shutter 250 so that EV for CMOS image sensor 30 has a predetermined inclination in the vertical direction (so as to render electronic front curtain trajectory 201 having a predetermined inclination with respect to electronic front curtain trajectory 200 that is used in normal photographing and that is set to follow rear curtain trajectory 300). Controller 401 then outputs an instruction on a flash start timing at which the flash device starts flashing. Electric charge resetting time Tr refers to a time from when CMOS image sensor 30 starts resetting of electric charges to when CMOS image sensor 30 ends the resetting. A predetermined inclination may in here be linear or nonlinear, but is set so that EV for CMOS image sensor 30 gradually increases in a first direction (from the upper end to the lower end in the exemplary embodiment). Covering time C refers to a time from when rear curtain 253 starts covering of CMOS image sensor 30 to when rear curtain 253 ends the covering.

An increased flash synchronization shutter speed can therefore be achieved in electronic front curtain photographing where an operation, of the mechanical front curtain is substituted by resetting of electric charges in CMOS image sensor 30, and covering is performed by rear curtain 253 of mechanical shutter 250. An imaging apparatus operating at a flash synchronization shutter speed applicable to daytime synchronization photographing can therefore be provided.

In some cases, when resetting of electric charges is quickly performed in electronic front curtain photographing, such that electric charges of all pixels of an imaging element are reset at once, particularly in daytime synchronization photographing, photography luminance of a subject in a distant view to which flash light does not reach differs greatly in the vertical direction, and a captured image might become unnatural. With the first exemplary embodiment, since EV is set to have a desired inclination in the vertical direction, an imaging apparatus having a flash synchronization shutter speed applicable to daytime synchronization photographing can be provided.

Each time of photographing, controller 401 can calculate an appropriate EV inclination in the first direction to control CMOS image sensor 30. A flash synchronization shutter speed can therefore be increased in various photographic environments including daytime synchronization photographing.

(2) In the first exemplary embodiment, controller 401 sets a flash start timing at or after an electric charge resetting end timing with which CMOS image sensor 30 ends resetting of electric charges, and causes, after the flash start timing, rear curtain 253 to start covering of CMOS image sensor 30.

Providing an instruction so that the flash, device flashes at or after the electric charge resetting end timing with which CMOS image sensor 30 ends the resetting of electric charges can securely start synchronization of flash light. Causing rear curtain 253 of mechanical shutter 250 to start covering after flashing starts can securely end the synchronization of the flash light.

(3) In the first exemplary embodiment, controller 401 sets a flash start timing so that the flash start timing is identical to an electric charge resetting end timing.

Lag A can therefore be specified to 0 second to set a timing for starting flash synchronization earlier. A user of the imaging apparatus will be less likely to miss a photo opportunity.

(4) In camera main body 1 according to the first, exemplary embodiment, when a covering time by rear curtain 253 of mechanical shutter 250 is specified to C second(s), a flash time by the flash device is specified to F second(s), a time from, an electric charge resetting end timing to a flash start timing is specified to A second(s), and a difference in EV between the upper end and the lower end of CMOS image sensor 30 is specified to x, controller 401 controls CMOS image sensor 30 and mechanical shutter 250 so that flash synchronization shutter speed TVc satisfies condition (1) shown below:

$$TVc = x/2 - \log_2(C+F+A) \qquad (1).$$

In other words, as illustrated in FIGS. 6A and 6B, controller 401 gives an instruction so that, after elapse of electric charge resetting time Tr second(s) illustrated in an electronic front curtain trajectory of CMOS image sensor 30 (201 in the example illustrated in FIG. 6A, 201a in the example illustrated in FIG. 6B), the flash device starts flashing after A second(s). After F second(s) from when the flash device starts the flashing, controller 401 then causes rear curtain 253 of mechanical shutter 250 to perform covering. Controller 401 then controls rear curtain 253 to end the covering in C second(s). Electric charge resetting time Tr refers to a time from start of resetting of electric charges in an exposure start line (each of the lines at the upper ends in the examples illustrated in FIGS. 6A and 6B) of CMOS image sensor 30 to end of resetting of electric charges in a final line (each of the lines at the lower ends in the examples illustrated in FIGS. 6A and 6B).

When an exposure time for the exposure start line is specified to Ts second(s), electric charge resetting time Tr can be obtained in accordance with equation (3) shown below.

$$Tr = Ts - (A + F) \qquad (3)$$
$$= 2^{-(TV+x)} - (A + F)$$

$$= 2^{-TV} \times 2^{-x} - (A+F)$$
$$= (A+F+C) \times 2^{-x} - (A+F)$$

Controller 401 can therefore, securely control the electronic front curtain, rear curtain 253, and a flash timing of the flash device in accordance with flash synchronization shutter speed TVc. An imaging apparatus capable of adjusting a flash synchronization shutter speed in accordance with a photographic environment including environment luminance can therefore be provided.

(5) In the first exemplary embodiment, control is performed so that a predetermined, difference in EV in the vertical direction of CMOS image sensor 30 falls within a range from 0.3 EV to 0.45 EV inclusive.

As a predetermined difference in EV exceeds 0.3 EV and increases, a faster operation can be achieved. As a predetermined difference in EV exceeds 0.45 EV and increases, unevenness becomes significant, and thus conformity to the JIS standard cannot be folly attained. An advantageous difference in EV is one that ranges from 0.4 EV to 0.45 EV inclusive, and a more advantageous predetermined difference in EV is 0.45 EV.

(6) In the first exemplary embodiment, image processor 403 applies a shading correction to a captured image based on a reverse inclination conversion characteristic having a half value or greater of an inch nation of EV.

Compared with the first method for increasing a flash synchronization shutter speed, where no shading correction is applied, camera main body 1 can therefore increase a difference in EV in the vertical direction. An imaging apparatus having an increased flash synchronization shutter speed can therefore be provided.

(7) In the first exemplary embodiment, when image processor 408 applies a reverse inclination shading correction having a value equal to or above a half value of an inclination of EV control is performed so that a predetermined difference in EV in the vertical direction falls within a range from 0.3 EV to 0.9 EV inclusive.

As a predetermined difference in EV exceeds 0.3 EV and increases, a faster operation can be achieved. If a predetermined difference in EV exceeds 0.9 EV, a reverse inclination shading correction having a value equal to or above 0.45 EV that is a half value of a difference in EV of 0.9 EV should be applied. In other words, as a predetermined difference in EV exceeds 0.9 EV and increases, reduction of unevenness becomes difficult, and thus conformity to the JIS standard cannot fully be attained. When a reverse inclination shading correction is applied, an advantageous predetermined difference in EV in the vertical direction falls within a range from 0.7 EV to 0.9 EV inclusive, and a more advantageous predetermined difference in EV is 0.9 EV.

Other Exemplary Embodiments

As described, the first exemplary embodiment has been described to exemplify a technique disclosed in the present application. However, the techniques in the present disclosure is not limited to this, and can also be applied to an exemplary embodiment in which modification, replacement, addition, omission, or the like is performed. In addition, a new exemplary embodiment can be made by combining constituents described in the above first exemplary embodiment.

Therefore, other exemplary embodiments will be described hereinafter.

In the first exemplary embodiment, CMOS image sensor 30 has been described as an example of an imaging element. An imaging element may be one that has a function of a rolling shutter type electronic front curtain, that captures a subject image, and that generates image data. Therefore, an imaging element is not limited to CMOS image sensor 30. However, when CMOS image sensor 30 is used as an imaging element, an inexpensive imaging element is available. An n-channel metal-oxide semiconductor (NMOS) image sensor may be used as an imaging element.

Figure 8:
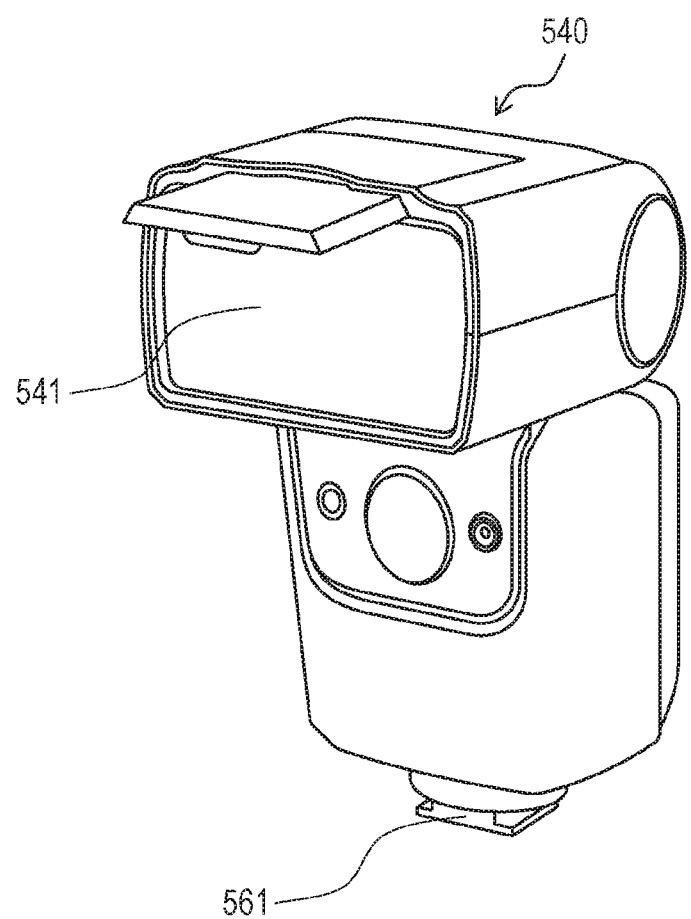
FIG. 8 is a perspective schematic view of an external flash device according to another exemplary embodiment.

In the first exemplary embodiment, flash device 40 built into camera main body 1 has been described as an example of a flash device for flashing. A flash device is not limited to such a built-in flash, but may be, as illustrated in FIG. 8, external flash device 540 including light emitting unit 541. Main body-side hot shoe 60 of camera main body 1 and external flash device-side hot shoe 561 of external flash device 540 are mechanically and electrically connectable to each other. An electrical connection used in here can be achieved through a connection between main body-side hot shoe electric contact 60a and a hot shoe electric contact on an opposing external flash device side. Controller 401 is capable of providing, via the electric contacts, an instruction for causing light emitting unit 541 of external flash device 540 to flash. A flash device may be an external flash device disposed away from camera main body 1. The external flash device includes a communication unit, and is capable of wireless communicating with the communication unit of camera main body 1. Wireless communication refers to, for example, infrared communication and communication based on a standard such as the Bluetooth (registered trademark) standard. A flash device may be one that can control a flashing timing via camera main body 1 when capturing an image. As described above, a flash device is not limited to flash device 40 built into camera main body 1. However, by using flash device 40 or external flash device 540 electrically connected as a flash device, a time lag from when resetting of electric charges ends to when flashing starts (lag A) can be shortened.

In the first exemplary embodiment, as an example, of a local plane shutter, mechanical shutter 250 including mechanical front curtain 252 and mechanical rear curtain 253 has been described, and, when performing synchronization photographing, an example using the electronic front curtain, instead of mechanical front curtain 252, has been described. As long as the electronic front curtain is always used regardless of a photographing condition, a focal plane shutter including only rear curtain 253 may be used.

In the first exemplary embodiment, when the electronic front curtain is used, rear curtain 253 is used as a rear curtain served as a function for mechanically covering subject light entering the imaging element (an aperture). When the focal plane shutter includes mechanical front curtain 252 and mechanical rear curtain 253, front curtain 252 may be used, instead of rear curtain 253, as a function for mechanically covering subject light entering the imaging element (aperture).

Figure 9A:
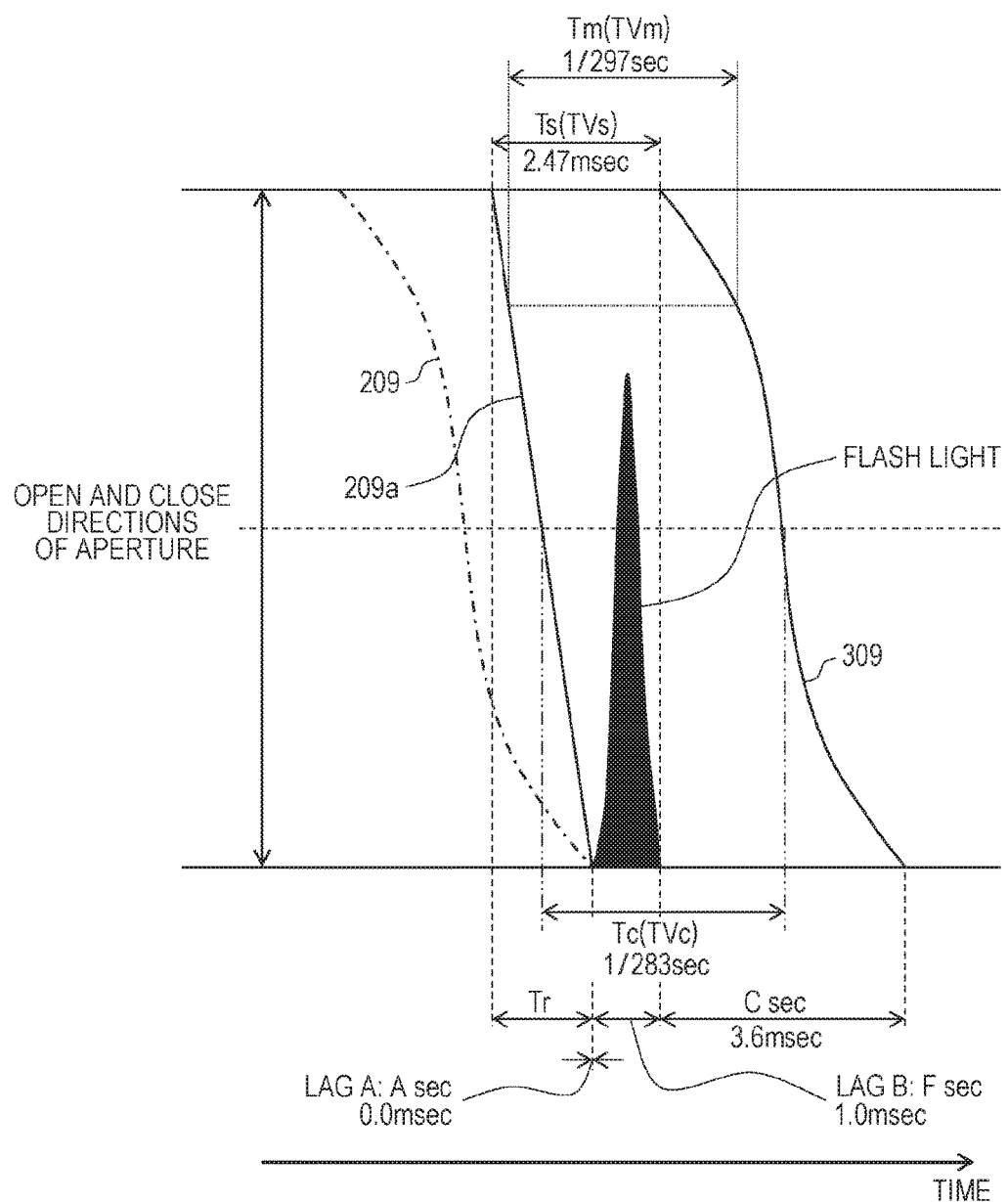
FIG. 9A is a time chart illustrating an exemplary modification of a rear curtain trajectory, as well as an electronic front curtain trajectory.
Figure 10A:
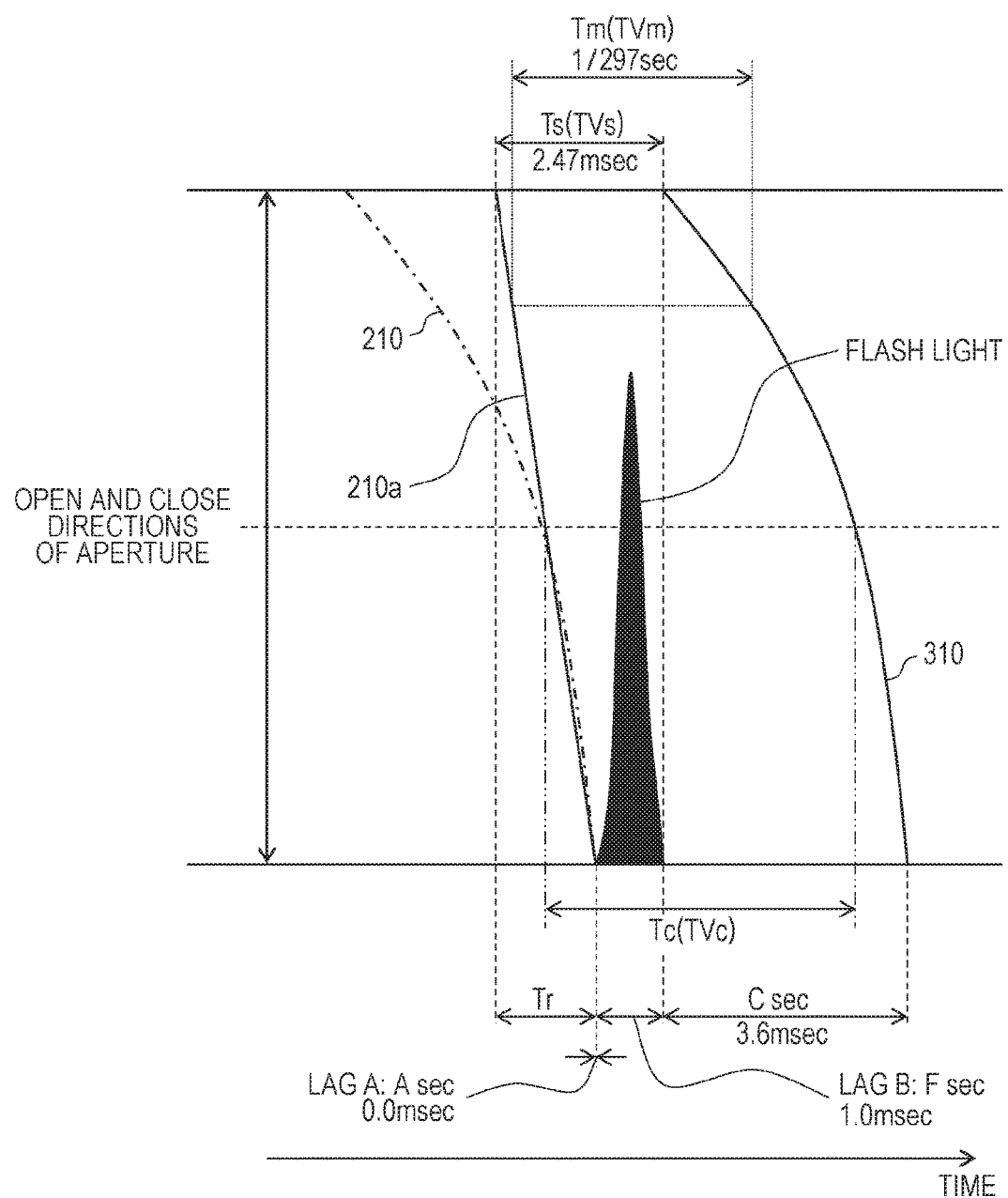
FIG. 10A is a time chart illustrating another exemplary modification of the rear curtain trajectory, as well as the electronic front curtain trajectory.
Figure 10B:
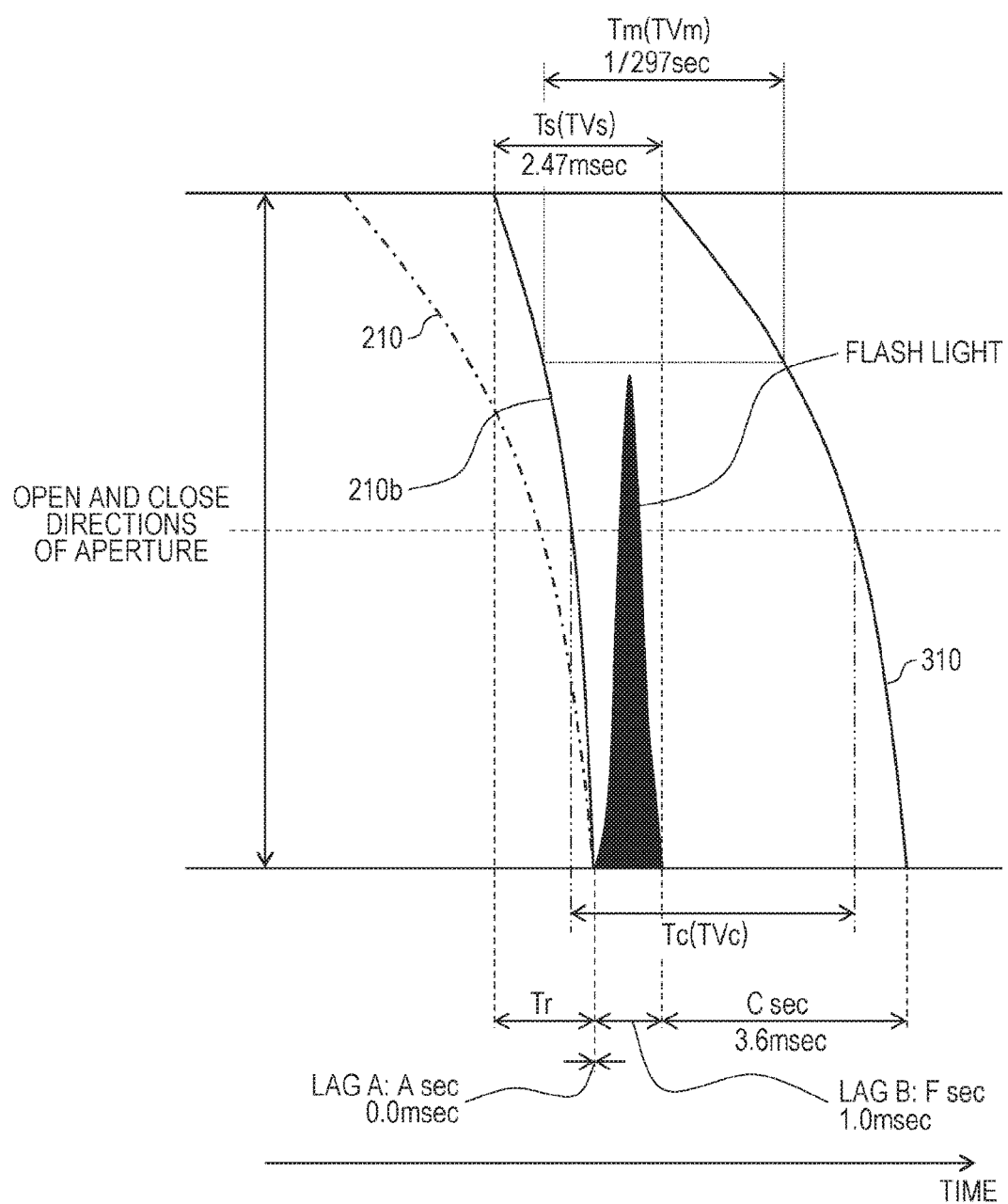
FIG. 10B is a time chart illustrating an exemplary modification of the electronic front curtain trajectory, with respect to the rear curtain trajectory illustrated in FIG. 10A.

In the first exemplary embodiment, to illustrate a concept of a method for increasing a flash synchronization shutter speed, rear curtain trajectory 300 rendering a linear trajectory has been described, as an example of a rear curtain trajectory, with reference to FIGS. 6A to 7B. As an example of an electronic front curtain trajectory, electronic front curtain trajectory 201 rendering a linear trajectory has been described, with reference to FIGS. 6A and 7A, and electronic front curtain trajectory 201a rendering a curve trajectory has been described, with reference to FIGS. 6B and 7B. Trajectories of the rear curtain and the electronic front curtain are not limited to these trajectories. Similarly to rear curtain trajectory 309, illustrated in FIGS. 9A and 9B, a trajectory with which an initial speed and a final speed are slower than a curtain speed indicated around a central portion may be used. A trajectory of the front curtain may be either a linear trajectory or a curve trajectory, as long as the trajectory has a predetermined inclination with respect to electronic front curtain trajectory 209 that is used in normal photographing and that follows rear curtain trajectory 309. In other words, a trajectory of the front curtain may be electronic front curtain trajectory 209a rendering a linear trajectory illustrated in FIG. 9A or electronic front curtain trajectory 209b rendering a curve trajectory illustrated in FIG. 9B. By making a trajectory similar or identical to electronic front curtain trajectory 209b, TV for the central line, denoted by TVc match to a geometric mean value of TV denoted by TVm. A trajectory of the rear curtain may be a trajectory with which an initial speed is slower, similar or identical to rear curtain trajectory 310 illustrated in FIGS. 10A and 10B. A trajectory of the front curtain may be a trajectory having a predetermined inclination with respect to electronic front curtain trajectory 210 that is used in normal photographing and that follows rear curtain trajectory 310. In other words, a trajectory of the front curtain may be electronic front curtain trajectory 210a rendering a linear trajectory illustrated in FIG. 10A or electronic front curtain trajectory 210b rendering a curve trajectory illustrated in FIG. 10B.

An electronic front curtain trajectory in flash synchronization photographing may have a predetermined inclination with respect to an electronic front curtain trajectory that is used in normal photographing and that follows a rear curtain trajectory, and may be a trajectory such that a time from when resetting of electric charges in a line with which exposure first starts to when resetting of electric charges in a line with which exposure finally starts (a time until the aperture fully opens) is Tr second(s).

In the first exemplary embodiment, lens-interchangeable camera, system 100 has been described as an example of an imaging apparatus. Camera system 100 may be a compact digital camera in which interchangeable lens 5 and camera main body 1 are integrated.

The above described exemplary embodiments have been described such that a direction toward which CMOS image sensor 30 resets electric charges is downward. However, the direction may be upward, leftward, rightward, or a diagonal direction. In any case, a direction toward which CMOS image sensor 30 resets electric charges may match to a direction toward which mechanical rear curtain 253 performs covering. Also in any case, EV for CMOS image sensor 30 has a predetermined inclination in a direction, toward which electric charges are reset.

Since the above described exemplary embodiments are used to exemplify the technique of the present disclosure, modifications, replacements, additions, omissions, and other amendments can variously be performed within the scope of the claims and their equivalents.

The present disclosure is applicable to an imaging apparatus that captures a still image with a flash. Specifically, the present disclosure is applicable to digital still cameras, compact digital cameras, cellular phones with a camera function, smartphones, and other similar devices.

What is claimed is:

1. An imaging apparatus comprising:
    an imaging element capable of capturing a subject image entered via an optical system to generate an image signal, and of resetting accumulated electric charges;
    an image processor that performs predetermined processing on the image signal generated by the imaging element to generate image data;
    a focal plane shutter including a rear curtain for covering the imaging element in a first direction; and
    a controller that sets, when photographing, an electric charge resetting time, for the imaging element, from start to end of resetting of the electric charges, and a covering time, for the focal plane shutter, from start of covering of the imaging element by the rear curtain to end of the covering, so that an exposure value (EV) indicative of an exposure amount for the imaging element has a predetermined inclination in the first direction, and that outputs an instruction on a flash start timing at which a flash device is caused to start flashing.

2. The imaging apparatus according to claim 1, wherein the controller sets the flash start timing at or after an electric charge resetting end timing at which the imaging element ends the resetting of the electric charges, and causes, after the flash start timing has passed, the rear curtain to start the covering of the imaging element.

3. The imaging apparatus according to claim 2, wherein the controller sets the flash start timing so that the flash start timing is identical to the electric charge resetting end timing.

4. The imaging apparatus according to claim 2, wherein when the covering time by the rear curtain is specified to C second(s), a flash time from the flash start timing to a timing when the flash device ends the flashing is specified to F second(s), a time from the electric charge resetting end timing to the flash start timing is specified to A second(s), and a difference in the EV for the imaging element between an end and another end in the first direction is specified to x,
the controller controls the imaging element and the focal plane shutter so that TVc that is a time value at a flash synchronization shutter speed satisfies a following condition:

$$TVc = x/2 - \log_2(C + F + A) \qquad (1).$$

5. The imaging apparatus according to claim 1, wherein a difference in the EV for the imaging element between an end and another end in the first direction falls within a range from 0.3 EV to 0.45 EV inclusive.

6. The imaging apparatus according to claim 1, wherein the image processor performs, for the image data, a shading correction in a direction opposite to the first direction based on a conversion characteristic having an inclination having a value equal to or above a half value of the predetermined inclination of the EV.

7. The imaging apparatus according to claim 6, wherein a difference in the EV for the imaging element between an end and another end in the first direction falls within a range from 0.3 EV to 0.9 EV inclusive.

8. The imaging apparatus according to claim 1, further comprising the flash device, wherein
    the controller sets the flash start timing for the flash device.

9. The imaging apparatus according to claim 1, further comprising a hot shoe having a contact electrically and mechanically connectable to the flash device that is detachable from the imaging apparatus,
    wherein
    the controller outputs the flash start timing to the hot shoe.

10. The imaging apparatus according to claim 1, further comprising
 a communication unit that communicates with the flash device in a wireless manner,
 wherein
the controller outputs the flash start timing to the communication unit.

* * * * *